United States Patent
Zeira et al.

(10) Patent No.: US 11,587,370 B2
(45) Date of Patent: Feb. 21, 2023

(54) DISTRIBUTED MAINTENANCE SYSTEM AND METHODS FOR CONNECTED FLEET

(71) Applicant: AVIS BUDGET CAR RENTAL, LLC, Parsippany, NJ (US)

(72) Inventors: Ohad Zeira, Parsippany, NJ (US); Sang Lee, Parsippany, NJ (US)

(73) Assignee: AVIS BUDGET CAR RENTAL, LLC, Parsippany, NJ (US)

( * ) Notice: Subject to any disclaimer, the term of this patent is extended or adjusted under 35 U.S.C. 154(b) by 0 days.

(21) Appl. No.: 17/533,807

(22) Filed: Nov. 23, 2021

(65) Prior Publication Data

US 2022/0084326 A1    Mar. 17, 2022

Related U.S. Application Data

(63) Continuation of application No. 16/279,899, filed on Feb. 19, 2019, now Pat. No. 11,182,984.
(Continued)

(51) Int. Cl.
*G07C 5/00* (2006.01)
*G07C 5/08* (2006.01)
(Continued)

(52) U.S. Cl.
CPC .............. *G07C 5/008* (2013.01); *G06Q 10/02* (2013.01); *G06Q 10/06315* (2013.01);
(Continued)

(58) Field of Classification Search
CPC ...................................................... G07C 5/008
See application file for complete search history.

(56) References Cited

U.S. PATENT DOCUMENTS

| | | | |
|---|---|---|---|
| 6,606,562 B1 * | 8/2003 | Gifford | G07C 5/008 342/357.31 |
| 7,581,434 B1 * | 9/2009 | Discenzo | G01N 33/2888 73/53.01 |

(Continued)

*Primary Examiner* — Shelley Chen
(74) *Attorney, Agent, or Firm* — Wayne Edward Ramage; Baker Donelson

(57) ABSTRACT

A system and related methods for management, planning and control of a connected fleet of vehicles. A unique, single integrated platform may be provided for management, planning and control of a connected fleet of vehicles, including fleet planning, in-fleeting operations, vehicle acquisition and provisioning, vehicle assignment, vehicle transfers, vehicle use operations, vehicle servicing, vehicle maintenance and repairs, and de-fleeting operations. Fleet communications can be by cellular, wireless, or low earth orbit satellite communications. Fleet vehicles include a programmable TCU installed in the vehicle and connected, directly or indirectly, to the CAN bus or similar vehicle network, and carries out various operations, including controlling vehicle access. The systems combines self-reporting and self-management of a connected fleet vehicle (with on-board and installed sensors configured to identify actual or potential issues or problems in the vehicle, and report, request, and obtain/dispatch servicing via its cloud or network communications interfaces), and predictive failure algorithms (based on historical and current connected fleet vehicle data), with multiple probabilistic distributions for the distributed fleet to dynamically, in real time, determine and dispatch service with greater efficiency and lower costs for fleet operations.

11 Claims, 12 Drawing Sheets

Related U.S. Application Data

(60) Provisional application No. 62/632,012, filed on Feb. 19, 2018.

(51) Int. Cl.
*G06Q 10/02* (2012.01)
*G06Q 10/20* (2023.01)
*G06Q 10/1093* (2023.01)
*G06Q 10/0631* (2023.01)

(52) U.S. Cl.
CPC ......... *G06Q 10/1097* (2013.01); *G06Q 10/20* (2013.01); *G07C 5/006* (2013.01); *G07C 5/0808* (2013.01)

(56) References Cited

U.S. PATENT DOCUMENTS

| | | | |
|---|---|---|---|
| 9,635,518 B2* | 4/2017 | Lee | H04Q 9/00 |
| 9,977,409 B2* | 5/2018 | Giering | G05B 9/05 |
| 10,168,697 B2* | 1/2019 | Hernandez Sanchez | G07C 5/0816 |
| 2005/0146424 A1* | 7/2005 | Giovanni | B60C 23/0408 340/445 |
| 2009/0024271 A1* | 1/2009 | Inoue | F02D 41/22 701/31.4 |
| 2009/0216584 A1* | 8/2009 | Fountain | G06Q 30/0201 705/7.29 |
| 2010/0324376 A1* | 12/2010 | Chinnadurai | G16H 50/20 600/300 |
| 2018/0284763 A1* | 10/2018 | Hernandez Sanchez | G06Q 50/30 |

\* cited by examiner

DISTRIBUTED MAINTENANCE SYSTEM AND METHODS FOR CONNECTED FLEET

This application is a continuation of U.S. patent application Ser. No. 16/279,899, filed Feb. 19, 2019, which claims benefit of and priority to U.S. Provisional Application No. 62/632,012, filed Feb. 19, 2018, both of which are incorporated herein in their entireties by specific reference for all purposes.

FIELD OF INVENTION

This invention relates to a distributed maintenance system and related methods for management of a connected fleet of vehicles.

SUMMARY OF INVENTION

In several exemplary embodiments, the present invention comprises a system using probabilistic models of failure dynamically in real time to determine and dispatch servicing, maintenance and repair services to connected fleet vehicles, particularly where the connected fleet is distributed. Servicing and maintenance of vehicle in a distributed fleet (e.g., shared vehicle or autonomous vehicle fleets, where vehicles are distributed among several possible locations between uses by a customer, member or other user) presents unique challenges compared to service and maintenance of vehicles in a more traditional hub fleet (e.g., rental fleets, where vehicles are located at a home hub between uses by a customer or other user). Because hub fleet vehicles are returned to a home hub after each rental, routine maintenance can be optimally scheduled, and identification and addressing of servicing and maintenance issues or problems can be more easily and quickly handled, typically there at the hub location itself. In addition, a fleet staff member typically has the opportunity to inspect and drive the vehicle in or between the hub lots between customer rentals, acting as an intuitive human sensor in addition to connected vehicle-based sensors and self-reporting.

Vehicles in a distributed fleet do not have these advantages, as they often are subject to serial use, typically for relatively short periods of time (i.e., less than a day) with no or limited servicing between uses. In many cases, by the time a problem manifests itself, it is during use by a customer or member of the vehicle sharing service. In addition to requiring higher cost emergency servicing or maintenance to respond to the problem, and higher overall use and "churn" of fleet vehicles, the circumstances result in an unhappy or upset customer or member (and subsequent customers or members who had planned to use the vehicle with the problem), which can adversely impact fleet use and revenues. More frequent preventative maintenance decreases vehicle problems during use, but greatly increases expense due to the costs associated with shuttling the vehicle more frequently to a maintenance/repair center, lost revenues from the vehicle not being available for rent, and possible additional costs from increasing the number of vehicles in the fleet to offset the lower time of availability for each vehicle.

The present invention combines self-reporting and self-management of a connected fleet vehicle (with on-board and installed sensors configured to identify actual or potential issues or problems in the vehicle, and report, request, and obtain/dispatch servicing via its cloud or network communications interfaces), and predictive failure algorithms (based on historical and current connected fleet vehicle data), with multiple probabilistic distributions for the distributed fleet to dynamically, in real time, determine and dispatch service with greater efficiency and lower costs for fleet operations.

In several embodiments, each fleet vehicle possesses several probabilistic distributions, including, but not limited to, the following: (a) A distribution representing the optimal maintenance window or windows for the fleet vehicle; (b) A distribution representing likely failure modalities for the fleet vehicle, assuming no maintenance; and (c) A distribution representing likely revenues predicted for the fleet vehicle over a particular time period (e.g., the next month or 30 days). These distributions are continually or periodically updated for each fleet vehicle in the fleet management system.

DETAILED DESCRIPTION OF EXEMPLARY EMBODIMENTS

Figure 1:
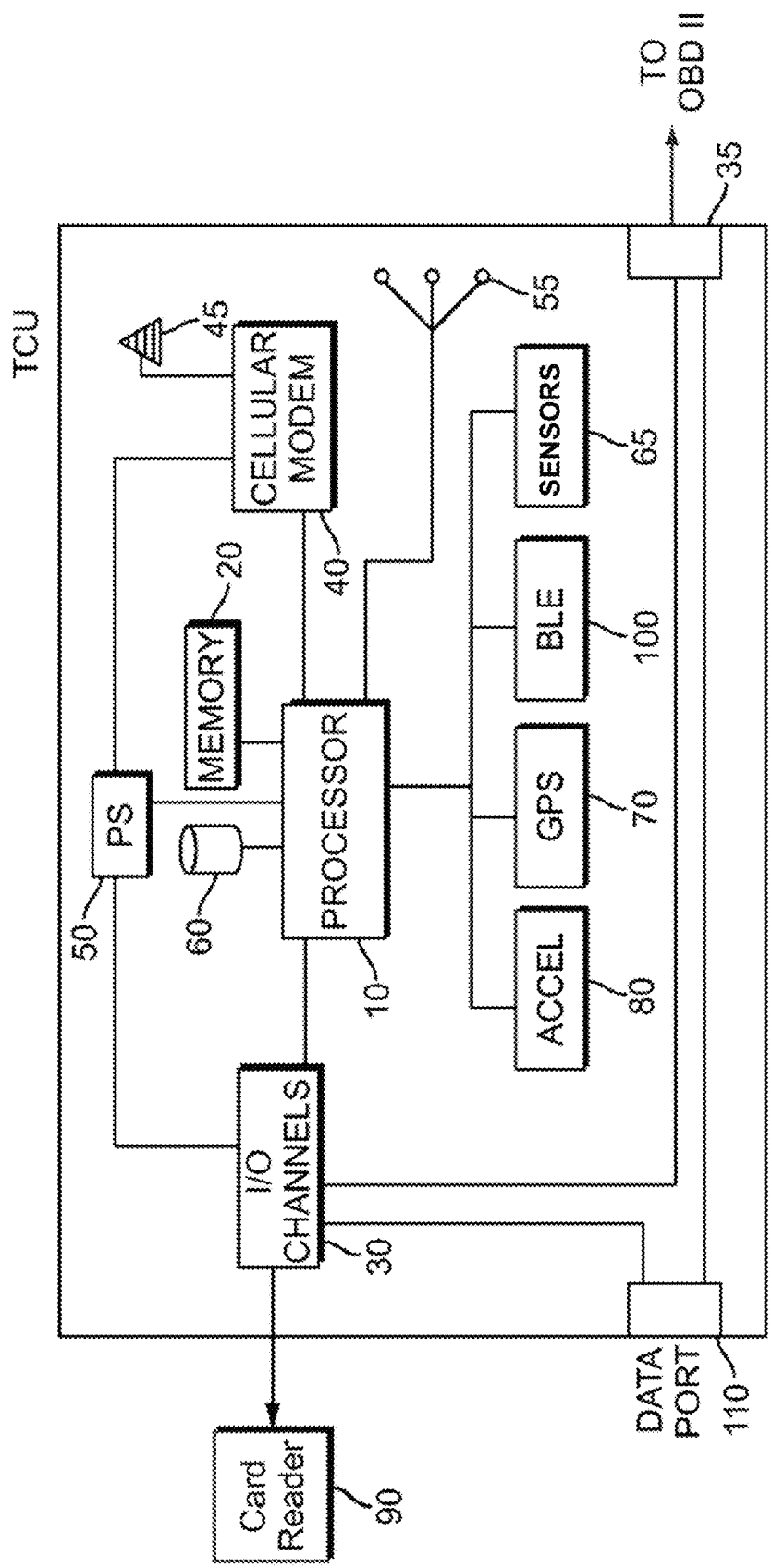
FIG. 1 is an exemplary depiction of a telematics control unit ("TCU") in accordance with an embodiment of the present invention.

In various exemplary embodiments, the present invention comprises a system and related methods for management, planning and control of a connected fleet of vehicles. A "connected fleet" comprises a plurality of vehicles, some or all equipped with (i) on-board sensors and computer systems for monitoring and capturing the operational status and performance of vehicle systems and components, and (ii) one or more electronic control and/or communications units for two-way or multiple pathway communication with one or more fleet management servers or networks, outside data centers or sources, other vehicles, and individual user or driver computing devices. A "connected user" comprises a user with one or more computing devices, including, but not limited to, mobile computing devices such as smart phones, tablets, or wearable devices, that provide extended, continuous, uninterrupted electronic communications with various computer networks, devices, and systems, including, but not limited to, elements of the connected fleet computing system or network, regardless of where the user is and how they are connected. Connected users may include, but are not limited to, drivers, passengers, customers, renters, members of a vehicle sharing service, employees, owners, or operators.

Vehicles in a connected fleet may include, but are not limited to, automobiles, trucks, vans, buses, motorcycles, bicycles, mopeds, construction and utility vehicles, battery-powered carts, golf carts, airplanes, aircraft, boats, watercraft, and the like. Vehicles may be controlled by a driver or user, or may be autonomous or semi-autonomous. A fleet may include, but is not limited to, a rental vehicle fleet, shared vehicle fleet, peer-to-peer or business-to-business transportation fleet, taxi-cab fleet, corporate vehicle fleet, municipal or governmental agency vehicle fleet, bus fleet, utility or construction vehicle fleet, truck fleet, or combinations thereof. A fleet may be homogenous or heterogeneous (i.e., a mixed fleet). Fleets may be combined to make larger fleets, and fleets may also be sub-divided into component fleets by various parameters (e.g., type of use, type of customer or user, country, state, city, county, or other defined geographical area). The term "fleet" as used herein includes fleets of all types and various combinations, components or sub-divisions thereof.

As described in detail below, in several embodiments the present invention comprises a unique, single integrated platform for management, planning and control of a connected fleet of vehicles. The invention (or portions thereof) manages fleet planning, in-fleeting operations, vehicle acquisition and provisioning, vehicle assignment, vehicle transfers (i.e., to another fleet or another component fleet in the larger fleet), vehicle use operations (i.e., reservations, use and return by a customer, member, driver or user), vehicle servicing, vehicle maintenance and repairs, and de-fleeting operations (e.g., removal of the vehicle from the fleet, return to manufacturer, or sale to third parties).

Vehicle Selection, Acquisition and Provisioning

A lead component of fleet management encompasses the planning of the mix of vehicles for a particular fleet or component of a fleet, as well as the process of acquiring a particular vehicle and then processing it for incorporation into the fleet (sometimes referred to as provisioning). These components are often referred to as "in-fleeting."

The selection of vehicles for a fleet requires consideration of several factors, including, but not limited to, acquisition cost, ease and cost of servicing, maintenance and repairs (i.e., minimize vehicle holding costs), whether the vehicle is appropriate for the intended use, whether the vehicle is appropriate for the intended market, whether the vehicle is compatible with the particular technology used by the fleet management system, whether the mix of vehicles includes a variety of vehicles to allow appropriate user choice and optimize the user experience, and whether the mix of vehicles includes "aspirational" vehicles that align with the brand image of the fleet owner or operator and maintain vehicle experience standards and user expectations.

Fleet vehicles can be acquired in a variety of ways, such as, but not limited to, purchasing and leasing. In some embodiments, some or all of the vehicles in a fleet may be owned by a person or entity other than the fleet operator or owner, including vehicles that may be intermittently or temporarily available for use in the fleet, such as in a peer-to-peer to business-to-business system. Thus, for example, an individual automobile owner may make their vehicle available for use in a car rental or sharing fleet when he or she is traveling or on vacation. In several embodiments, their vehicle may already be enrolled and provisioned in the fleet, and can be easily and quickly made available for use through a variety of means as described below.

Provisioning takes place after acquisition of the vehicle. This includes the addition and installation of necessary equipment and materials, as necessary, for integration of the vehicle into the fleet and subsequent use. For example, an automobile being added to a car rental or sharing fleet may be equipped with an access card reader, a telematics control unit (TCU) or similar interface or control system, an electronic toll pass unit, one or more gasoline cards, and the like. The TCU is assigned to the particular vehicle in the fleet management system, typically in an administrative unit or as an administrative function. The vehicle may be assigned to a particular fleet group or component, and assigned to one or more locations (e.g., a home location, parking spot, or the like). If the vehicle is part of a commercial car rental or sharing fleet, it may also be assigned a particular class for pricing, availability to particular users, and the like.

The extent to which a particular vehicle needs particular equipment added, such as a TCU, depends upon the characteristics of the vehicle (e.g., make, model and year). Many vehicles are manufactured with a variety of integrated sensors and computer systems for monitoring the operational status and performance of vehicle systems and components, although the configuration of sensors and computer systems varies by type, model and year of manufacture. For example, modern automobiles typically comprise a plurality of vehicle sensors and systems connected, directly or indirectly, to a controller area network ("CAN bus"), with data and information available through devices plugged into a data port, such as the On Board Diagnostics II port ("OBD II").

In several embodiments, the present invention uses a programmable TCU installed in a vehicle and connected, directly or indirectly, to the CAN bus or similar vehicle network. The TCU may be directly wired to the vehicle network or components, or may be plugged into or otherwise connected to a data port, such as the OBD II port. As described in U.S. Pat. No. 9,635,518 (issued Apr. 25, 2017 to Avis Budget Car Rental, LLC), which is incorporated herein by specific reference for all purposes, connecting the TCU to the OBD II port has the advantage of enabling the TCU to be easily and quickly installed as an after-market device in the fleet vehicle, without requiring manual direct wiring or connection of the TCU to the vehicle network or various vehicle sensors and systems. A TCU may be self-powered, or powered by vehicle energy sources by connection to the vehicle or OBD II port. The TCU receives data and information from existing vehicle sensors and computing systems. Sensors include internal and external sensors. These sensors and computer systems may be more complex for semi-autonomous and autonomous vehicles, such as those described in U.S. Pat. No. 9,616,896 (issued Apr. 11, 2017); U.S. Pat. No. 9,587,952 (issued Mar. 7, 2017); U.S. Pat. No. 9,517,755 (issued Dec. 13, 2016); U.S. Pat. No. 9,499,172 (issued Nov. 22, 2016); U.S. Pat. No. 9,469,307 (issued Oct. 18, 2016); U.S. Pat. No. 9,440,652 (issued Sep. 13, 2016); and U.S. Pat. No. 9,278,689 (issued Mar. 8, 2016); all of which are incorporated herein by specific reference for all purposes.

Direct connection of the TCU to the OBD II port enables the TCU to communicate through the port with manufacturer-installed sensors, electronics, data sources, operating systems, and computing system. The TCU may thus engage in two-way communications with certain existing vehicle components. When installed in a vehicle, and programmed for operation in connection with the specific vehicle and OBD II port device to which it is connected, the TCU may execute specific actions within or through the vehicle, such as activating lights, horns, unlocking and locking door locks, and the like. The TCU also may be programmed to disable or deactivate certain vehicle systems and components, such as the vehicle ignition or starter. This capability is very useful where the vehicle may be used by different people in different vehicle programs, such as a rental program, a sharing program and corporate or municipal fleet program.

In several embodiments, the TCU includes at least one processor and a chipset for providing cellular communication capability, thereby enabling the TCU to engage in two-way data communication via existing cellular telephone networks. Through this communication capability, the TCU may identify itself and the vehicle in which it is installed to the management system, and receive programming from the management system so that the TCU maybe utilized in the particular vehicle in which it is installed. Upon installation, the TCU will detect vehicle identification information and transmit that information to the management system. The management system, or a backend or subset system networked to the management system, can thereafter select the appropriate programming for the vehicle make and model identified by the TCU, and cause the management system to transmit firmware updates and programming to the TCU so that it may be properly configured for use in the installed vehicle.

As shown in FIG. 1, the TCU includes at least one processor 10 for executing program instructions. The processor 10 can be coupled to removable/non-removable, volatile/non-volatile system memory 20 and computer data storage 60, for permanent or temporary storage of programming, and system and sensor data. The memory can store computer code, computer readable instructions, data structures, program modules, and other data. For example, and not meant to be limiting, data storage 60 can be a hard disk, a solid state drive, a magnetic disk, an optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like. Multiple processors, and multiple core processors, can also be provided.

The TCU includes input/output ("I/O") channels 30 for communication with the vehicle via the OBD II port via a connection at 35. These communication channels may be one-way or two-way, enabling communication via the OBD II device with vehicle sensors, processing systems and buses. These channels provide discrete signals that control the actuations of features like door lock/unlock, activation of the horn, and enabling or disabling the vehicle starter. These channels may also be used for control of actuations not present on the OBD II port of the car, via direct or wireless connections.

The TCU also includes a modem 40 and an associated antenna 45 enabling two-way cellular communication with the fleet management system. The modem 40 can comprise one or more communications components or modules, which can provide cellular or mobile data communication capability. The modem 40 can operate on any frequency available in the country of operation. Although 3G or 4G capability (or better) is preferred, the type of communication can include, but is not limited to, GPRS, EDGE, UMTS, 1×RTT or EV-DO, WiMAX, HSPAT, LTE and LTE Advanced standards. As an alternative, the TCU and modem could enable two-way satellite digital audio radio service via satellite communication networks.

The TCU may be powered by the vehicle via the OBD II port connection. As an alternative, or in addition, the TCU may include a direct $12v$ power connection to the vehicle power source. The TCU also may include a power supply (PS) with a battery 50, to be independently self-powered or to provide back-up power. In the latter circumstance, the battery enables operation of the TCU, including cellular transmission of data, for a period of time in the event of a vehicle power loss or if the device is disconnected from the power source. The TCU is configured to sense the loss of power or data from the vehicle, and to determine whether that power or data loss is due to disconnection of the TCU from the OBD II port or a problem with the vehicle battery or power connection. For example, the cable between the TCU and the OBD II port can include a push-type switch on the connection plug, which would enable the TCU to detect whether the cable is plugged or unplugged. The TCU can also continuously monitor battery voltage, and can be programmed to report gradual voltage decay. The TCU can also check for power loss at the TCU power input pins to determine whether the TCU is receiving power. Accordingly, if power loss occurs, the TCU will notify the management system that it is utilizing power from the battery 50. If the TCU reports that the OBD II cable is disconnected, the management system can thereafter determine if the disconnection of the TCU was authorized, for example, where the vehicle is scheduled for servicing, or if the disconnection is not authorized. If the cable remains connected, and no voltage decay has been detected, the system can determine whether the power loss is within the TCU or within the vehicle by checking for power at the TCU input pins.

The TCU may also include one or more indicator lights 55, visible outside the device, to provide an indication of connection status and power. It may also include a buzzer or similar type of alarm, which can be programmed to activate when the TCU is installed, or in the event of loss of data or power connectivity. Different colors and patterns of lights can be utilized to indicate various issues with the device, and provide indications to an installer regarding success or failure of the installation. In several embodiments, the TCU may comprise an LCD or similar display screen for display of messages, alerts, or other text.

While the TCU may be primarily designed to receive data and information from existing vehicle sensors via the OBD II port or otherwise, the TCU may itself include additional sensors 65 and other technology to provide additional information to the fleet management system. The TCU may include a GPS unit 70, which includes a receiver that receives position information from a constellation of satellites, as is known in the GPS art. Additional technology can be incorporated into the GPS receiver to improve the accuracy of the equipment when the vehicle is located within metropolitan urban areas and in tunnels. For example, cellular triangulation, WiFi triangulation, and Bluetooth triangulation can be utilized. Data from the GPS unit can be read by the TCU and reported to the fleet management system on a continuous or periodic basis, or upon the occurrence of a specific event.

The TCU may also include an accelerometer 80, such as a three-axis accelerometer, to detect and report vehicle impacts and driving habits. This sensor capability enables the TCU to set programmable thresholds, and detect and report when the accelerometer readings exceed those thresholds. The thresholds can be set to detect and report vehicle impacts, aggressive braking or acceleration, or improper handling of the TCU. Such data may be used by the management system to monitor, evaluate or rate driver behavior, to detect accidents, or to trigger maintenance on the vehicle. The accelerometer data may also be combined with incline measurements to detect vehicle towing or tampering. Such sensors may be programmed as always-on sensors in order to detect impacts, towing, and the like, even when the vehicle is not in use. Sensors installed in the TCU may also include their own processor capability. Additional sensors that could be incorporated into the TCU include, but are not limited to, light sensors, pressure sensors, heat sensors, occupancy sensors, motion sensors, and vibration sensors.

Additional sensors and devices may also be installed in a vehicle and directly connected to the TCU to provide additional system functionality. For example, the TCU may be connected to a card reader 90 installed on or in the vehicle to enable vehicle access by persons using an access card. The card reader may be installed on the windshield or in the dashboard to permit access to a vehicle without a key. The card reader can connect to the TCU via the I/O channels 30, via a dedicated interface such as a serial interface or a Wiegand interface, or through a wireless interface such as Bluetooth. Other devices that authenticate a user and permit access or activation of a vehicle may also be installed, including, but not limited to, a fingerprint reader, a touchpad sensor or keyboard, a retina scan device, a breathalyzer (or other sobriety testing devices), and the like. Additional sensors and devices that can be installed in the vehicle on an after-market basis for communication with the TCU include, but are not limited to, an occupancy sensor, a smoke detector, and sensors to detect hazardous or illegal substances. If the vehicle includes a key storage compartment or lock-box, a sensor to detect the presence of the key, or a device to control access to the compartment, may also be installed and placed in communication with the TCU.

The TCU may further include dedicated short range communication capability, via a built in communication device, such as a Bluetooth Low Energy (BLE) device 100. This technology enables wireless local communication with the TCU. For example, if the dedicated short range communication technology includes Bluetooth capability, the TCU can enable keyless access to a vehicle, for example, via a Bluetooth-enabled mobile device, such as a smartphone or tablet. To utilize this technology, an authorized user can press a button, provide a code, or engage in other authentication schemes via a mobile device, thereby causing a wireless signal to be transmitted over a short distance and be received by the TCU dedicated short-range communication device. The TCU thereafter confirms whether the signal is valid and, if so, commands the vehicle to unlock the doors via the OBD II connection. Wireless short-range communication technology, standards, and formats that can be utilized for this type of communication include, for example, Bluetooth, BLE, ZigBee, RFID, NFC and WiFi Direct.

Short range communication technology may also be utilized to monitor vehicle location at a facility or to detect when a vehicle is returned to or removed from a facility. In one implementation, the TCU may act as a transmitter (beacon), and receivers positioned around the lot receive the transmitted signal and notify the management system of the position of the vehicle using wired or wireless protocols and communication capabilities built into the facility. A receiver may also be located at the exit gate of the facility, to permit egress of authorized vehicles, and to inform the management system that the vehicle is exiting the lot. The system can also be configured such that the management system transmits contract data to a gate agent when a vehicle approaches the exit gate, such that the gate agent can check for proper identification. In an alternate implementation, the TCU can act as a receiver, which receives information from beacons positioned at a facility and transmits location data to the management system via the TCU cellular connection.

Additional functionality can also be provided where the TCU includes short range communication capability. For example, a user with a Bluetooth enabled mobile device could activate vehicle components, such as flashing the lights or blowing the car horn in order to identify a vehicle in a lot. A user might also activate vehicle remote start technology remotely via a mobile device. A short-range RF enabled TCU, operating as a beacon, could be sensed by a user mobile device and displayed on the user's device in a map showing the location of the user with respect to the vehicle, thereby assisting the user in locating the vehicle. Similarly, a short-range RF enabled TCU would permit the TCU to be located and tracked as a piece of equipment in inventory, when the TCU is not installed in a vehicle. Dedicated short-range communication capability would also enable the TCU to receive vehicle-to-vehicle, vehicle-to-infrastructure, and positive train control technology warnings and communications, which could be forwarded to vehicle occupants, or transmitted to the management system via the TCU.

A TCU with short range communication capability would also enable peer-to-peer communication between TCUs in different vehicles. This is useful in managing a fleet of vehicles, as a TCU in one vehicle can communicate with the fleet management system via one or more TCUs installed in nearby vehicles. In this manner, two-way communication can be maintained between a vehicle and the fleet management system when the vehicle has no cellular communication capability due to malfunction or loss of signal. Through this chain of communication, the fleet management system can receive data from an out of communication vehicle and can transmit programming and instructions to that vehicle via a nearby TCU or series of TCUs.

As shown in FIG. 1, the TCU also includes a data port 110. The data port enables access to the OBD II data for vehicle maintenance and diagnostic purposes, without the need to disconnect the TCU. The data port 110 may emulate an OBD II data port, so that an OBD II device can be plugged into the TCU data port.

For ease of installation and programming, all of the components of the TCU are preferably housed together in a single, rigid, tamper-resistant case designed to be securely installed inside a vehicle, typically underneath the dashboard of the vehicle, with a cable connection or direction connection to the vehicle OBD II port. However, certain components of the TCU could be housed elsewhere without departing from the spirit and scope of the invention. For example, the TCU could rely upon an accelerometer or a GPS unit located outside the TCU, including, for example, systems installed by the vehicle manufacturer. However, such configurations increase programming and installation complexity. Further, reliance on external systems and sensors make it more difficult to track the TCU and conditions associated with its transport, as these sensors could not provide data to the management system in the event the TCU is removed from the vehicle.

In several embodiments, the TCU or similar components may be contained in a modified ignition key, as further described in U.S. Pat. No. 8,841,987 (issued Sep. 23, 2014 to Local Motion, Inc.), which is incorporated herein by specific reference for all purposes.

The TCU typically includes a single processor. However, an alternative configuration may utilize two or more processors. Where two or more processors are present, each may be programmed to operate in a different vehicle mode. For example, one processor may be pre-programmed to operate in a vehicle rental mode, while a second processor is pre-programmed to operate in a vehicle sharing mode. In a dual processor configuration, a controller may be included to activate the appropriate processing system in accordance with the active mode set by the management system or through other means described herein.

The apparatus illustrated in FIG. 1 is exemplary, and is not intended to suggest any limitation as to the scope of use or functionality of operating architecture. Neither should the apparatus be necessarily interpreted as having any dependency or requirement relating to any one or combination of components illustrated therein.

Figure 2:
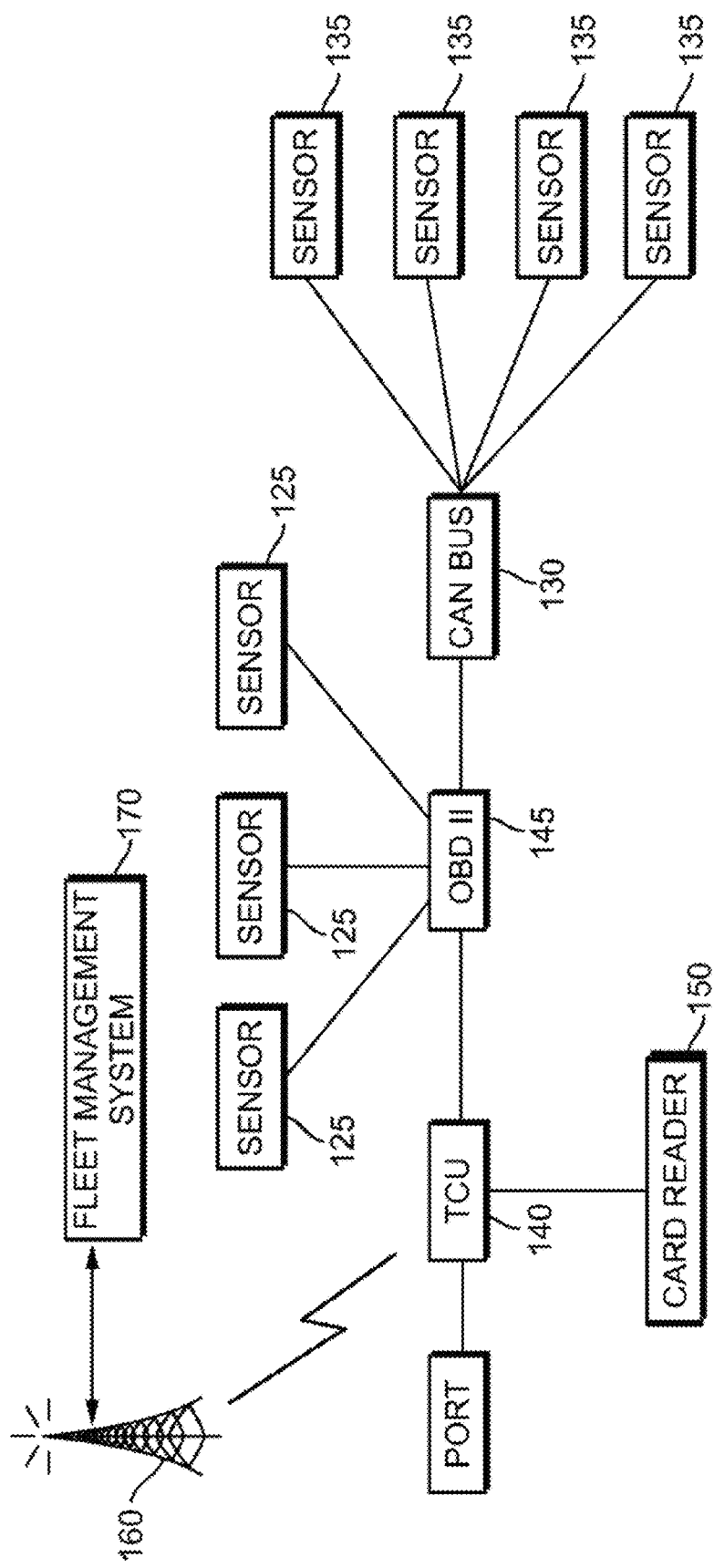
FIG. 2 is an exemplary depiction of a TCU installed in a vehicle in accordance with an embodiment of the present invention.

An exemplary depiction of a TCU installed in a vehicle is shown in FIG. 2. The OBD II is connected to vehicle sensors 125 and vehicle networks, such as the controller area network or CAN bus 130. Additional vehicle sensors, microcontrollers, a host computer, and other systems 135 are also connected to the CAN bus. The TCU 140 receives data and information from the OBD II port 145 through a wired connection. Since the OBD II port is connected to the CAN bus, the TCU will have access to CAN bus data, information, systems and sensors. The TCU may also be connected to external sensors and devices added to the vehicle, such as a card reader 150. The TCU 140 communicates via cellular data network 160 with a fleet management system 170.

The TCU, interfacing with the vehicle via the OBD II port, can monitor various vehicle systems and sensors, determine vehicle conditions, and report data indicative of vehicle status and performance to the fleet management system, in accordance with TCU programming. This includes, for example, vehicle VIN, fuel level, odometer readings, vehicle battery level, door status, ignition status, tire pressure, headlight sense, window up/down status, seat adjustment status, radio station presets, operating temperatures, operating pressures, vehicle speed, engine fuel air mixtures, oil quality, wiper usage, break pad conditions, air-bag deployment, and other data from vehicle sensors and vehicle computer systems. The TCU can also receive and communicate data from in-vehicle communication devices and warning systems, such as vehicle-to-vehicle and vehicle-to-infrastructure communication devices and systems and positive train control technology. The TCU can also monitor and report diagnostic trouble codes (DTC) and malfunction indicator lamps. The TCU also monitors and reports data derived from TCU components and sensors, including GPS data, accelerometer data, and IMEI and SIM card numbers. The TCU processor monitors all of this data and information, formats and stores the applicable data in the memory and/or data storage device, and transmits data to the management system, all in accordance with TCU programming. Transmission of data may be programmed to occur on a continuous, periodic or event-driven basis, or a combination thereof. Different transmission timing can also be set in accordance with a particular vehicle TCU operating mode. The TCU processor can also employ data compression protocols and methodologies, such as MQTT protocols, in order to limit the amount of memory required or to minimize data transmission and the costs associated therewith.

Figure 3:
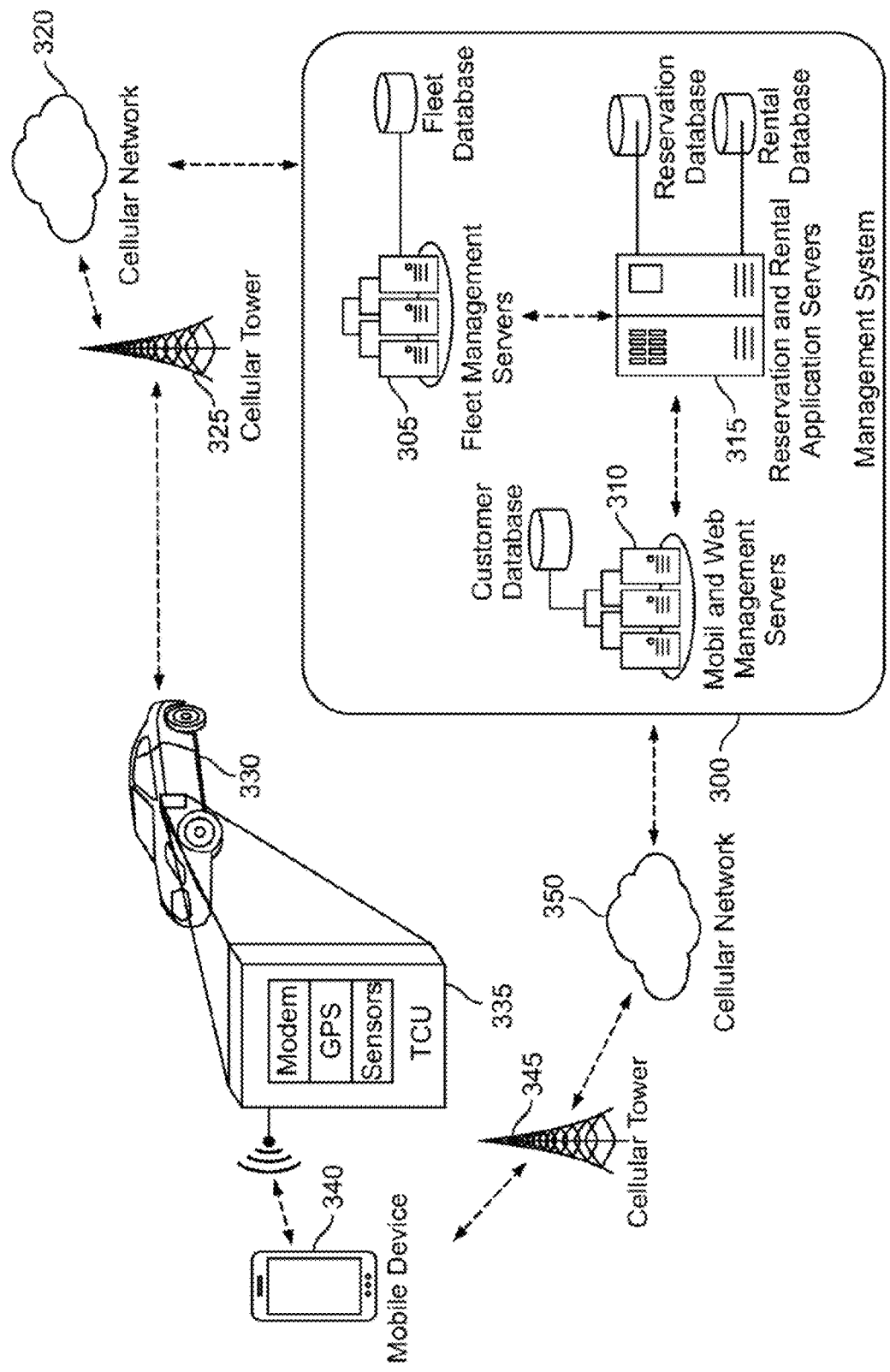
FIG. 3 is an exemplary depiction of a network environment including a vehicle, a TCU, and a fleet management system, in accordance with an embodiment of the present invention.

FIG. 3 depicts an example of a network environment in accordance with an exemplary embodiment of the invention. As depicted therein, management system 300 includes a plurality of sub-systems including, for example, fleet management servers 305, mobile and web management servers 310, and reservation and rental application servers 315. Each subsystem may be connected to one or more databases and processors. The management system may also include a backend system where OBD II codes and protocols associated with different fleet vehicles may be managed and stored. The management system communicates via cellular networks 320 and cell towers 325 with TCUs installed in fleet vehicles 330. These communication systems enable two-way communication between the management system 300 and each TCU 335. The TCU 335 includes various hardware components including, for example, a processor, memory and data storage capability, sensors, and GPS technology. The TCU 335 also includes I/O channels for communication with sensors installed on the vehicle outside the TCU, and means to connect the TCU to factory installed vehicle sensors and systems, such a cable that connects the TCU to the vehicle OBD II port. TCU 335 also includes a modem and antenna, which enables communication between the TCU and cellular networks via cellular towers. Finally, TCU 335 may include short range communication technology which enables local communication with mobile devices 340, such as a user's mobile phone. The short range communication capability may enable the TCU to communicate with sensors positioned around a facility, and with TCUs installed on nearby vehicles as described above. Using a mobile device, an authorized person may communicate with a vehicle TCU 330/335 and remotely initiate certain vehicle actions. Separately, an authorized person may communicate with the management system 300 via a mobile device 340 having cellular communication technology, via cellular network connection 345, 350.

Figure 9:
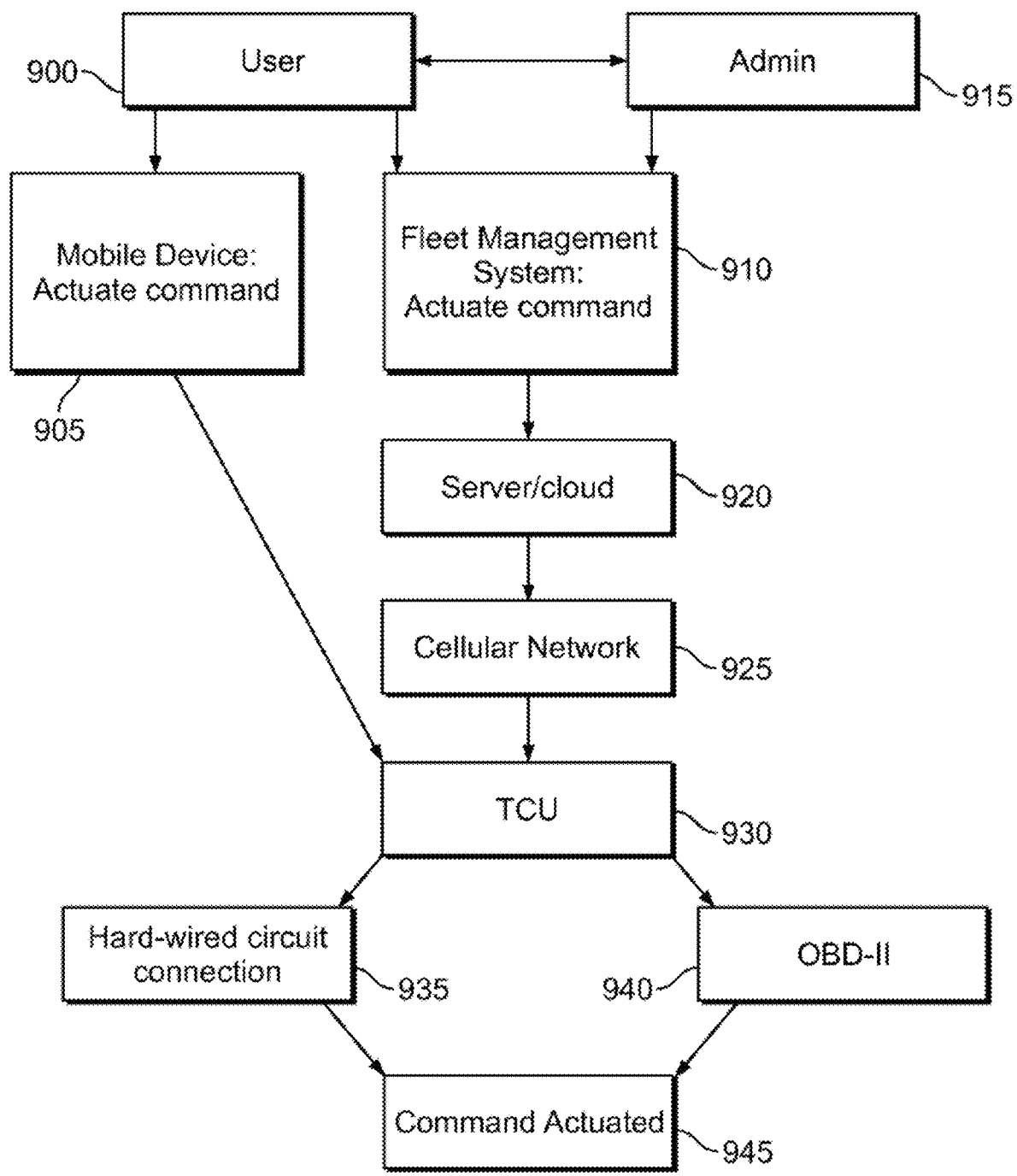
FIG. 9 is a flow chart depicting command-response communication in one mode of operation.

The TCU may receive request-response commands from the fleet management system, as depicted in FIG. 9 In response to such commands, the TCU can obtain data from vehicle sensors and systems, and provide responsive data communication to the fleet management system. Where the command entails activating a vehicle system, for example, a command to flash the lights or to open the door locks, the TCU may communicate with the appropriate system or device, initiate the requested action, inform the management system that the command was executed, and confirm the status of such system after executing the command (e.g., doors are now unlocked).

The TCU may also monitor sensors for event triggered actions, such as a low battery indication or a crash indication. When these indications are noted, the TCU automatically transmits a signal with the appropriate data to the fleet management system, where appropriate responses, such as scheduling the vehicle for maintenance or repairs, can be initiated.

An entire fleet of vehicles may be equipped with TCUs in accordance with the present invention, enabling the fleet management system to monitor the vehicles, collect data, execute commands within vehicles, and manage the vehicle fleet. The management system can be configured as a centralized system, or a distributed system. It can be operated in whole or in part in the cloud or on a series of servers. The fleet management system can include a plurality of sub-systems, including vehicle rental reservation management, vehicle sharing reservation management, fleet management, and vehicle maintenance management.

The TCU processor can control the TCU components to allow for easy integration into different types of vehicles. Therefore, although the TCU of the present invention is expressly intended for use with automobiles, it can be installed in other types of equipment such as, but not limited to, motorcycles, trucks, buses, trains, watercraft, aircraft, and the like.

The processor can also monitor TCU power consumption and limit consumption of power when desirable. For example, when the vehicle is experiencing normal operations, the TCU collects and transmits data to, and receives instructions from, the management system. However, when an extended period of vehicle non-use is detected, the TCU may initiate a low-power mode where the TCU minimizes data collection, and cellular communications are curtailed in order to limit the risk of vehicle battery drain. However, even in a low-power mode, cellular communications should be initiated periodically so that the device can receive programming and related information. In the event that the TCU is disconnected from the OBD II port, the TCU may enter an extreme low power mode, for example, where it communicates with the management system solely to report that its location and an indication that it has been disconnected from the OBD II port.

The TCU of the present invention may be programmed so that a vehicle can be operated in different vehicle modes. The system, methods and apparatus of the present invention enable the device to be toggled between these different modes through a number of different actions, including via pre-programmed instructions, commands issued by the management system, or in response to certain actions of an authorized person. Accordingly, vehicles equipped with these TCUs may be used in multiple fleet programs, or switched from one fleet or program to another to in response to demand. In these different modes, different vehicle operations may be permitted or curtailed. For example, the TCU may be programmed to operate in a "rental mode," where the vehicle is available as part of a rental program. The TCU may be programmed, when a vehicle first enters this mode, such that the doors are unlocked, the starter is enabled, and the alarm is disconnected, as the vehicle would normally be located at a rental facility and controlled by the fleet manager. This vehicle may be accessed by a user holding a rental reservation, started with a traditional car key, and driven off a lot after the driver's identification is confirmed. In this mode, vehicle data such as mileage and gas levels are monitored and transmitted periodically to the fleet management system. At the completion of the rental period, when the vehicle is returned to the rental lot, the TCU may be programmed to transmit final mileage and fuel levels to the management system for invoicing/billing purposes. Completion of a rental reservation may be noted automatically when the vehicle arrives at the lot via an RF enabled TCU or via the GPS system, or manually by a lot attendant.

The TCU may also be toggled to a "sharing mode." In the sharing mode, the TCU may be programmed such that the vehicle doors are locked, the vehicle starter is disabled, and the alarm is activated, as vehicles in a sharing program are typically stored in a location that is not controlled by the fleet manager. In the sharing mode, a user may access the vehicle and enable the starter without a key, for example, by waving an access card key over the vehicle card reader. Other access methods may also be utilized. The TCU confirms that the access action is authorized by matching the received data with data transmitted by the management system to the TCU in advance of the sharing reservation period.

Figure 4:
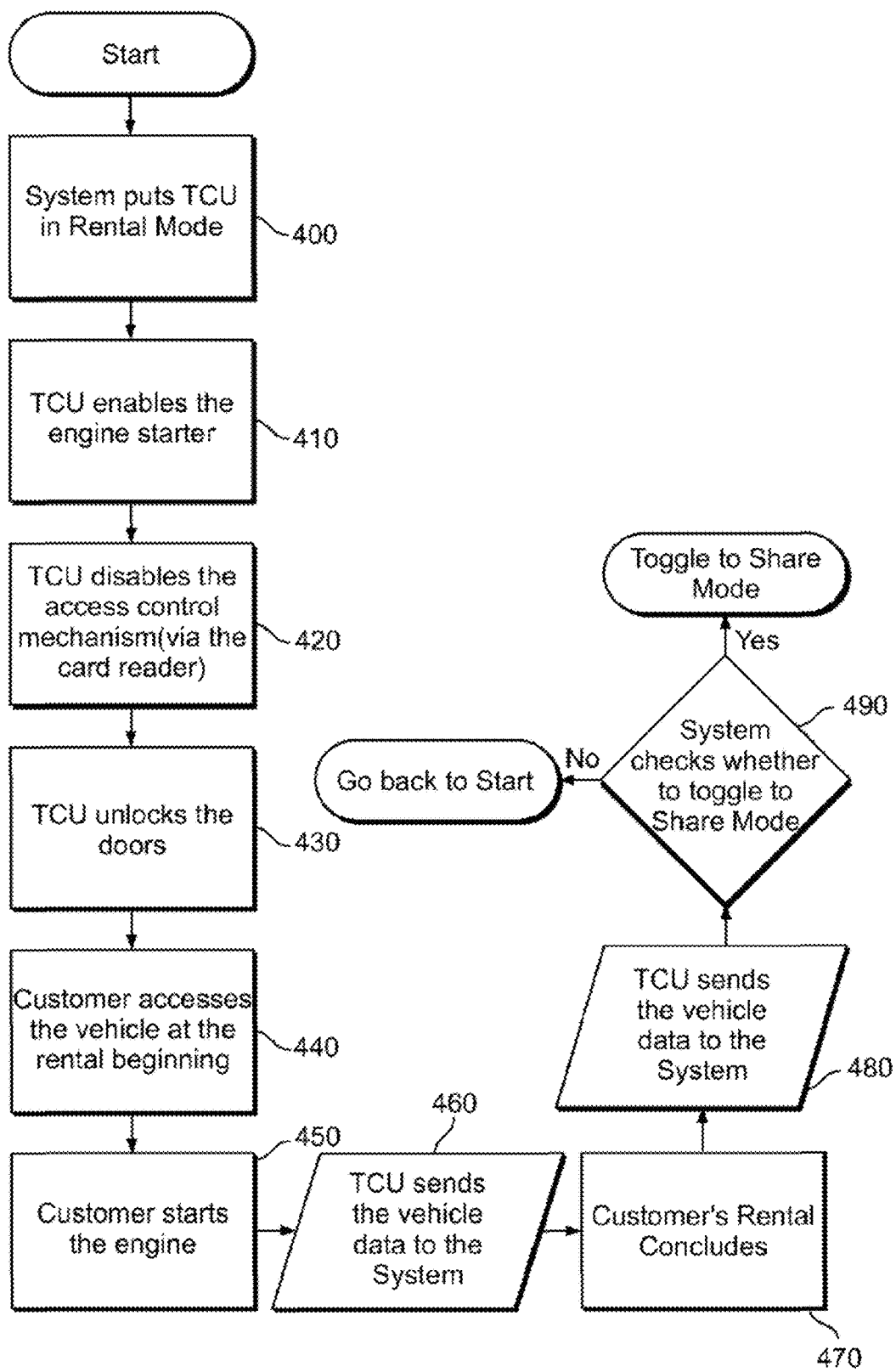
FIG. 4 is a flow chart of an exemplary method of operation pertaining to a vehicle in rental mode in accordance with an embodiment of the present invention.

FIG. 4 shows an exemplary flow chart wherein a vehicle TCU is toggled to a rental mode 400. In this mode, the vehicle is stored in a rental lot, which is typically a controlled location. Here, the vehicle may be left unlocked, with the starter enabled, so that the user may gain easy access and start the vehicle. In this mode, the TCU enables the engine starter 410, disables the access control device 420, such as a card reader, and unlocks the doors 430. When the rental period begins, a user accesses the vehicle 440, and starts the engine 450. The TCU notes that the doors were accessed and the vehicle started and transmits this data to the management system 460. The TCU may also inform the management system of the vehicle fuel level and odometer reading, and any other pertinent data that the system operator or owner desires the fleet management system to collect. If the lot includes an exit agent, data may be transmitted to that agent so that the driver's identification may be checked. In the alternative, the exit gate may be opened via the local communication capability previously described. The TCU operating in conjunction with the GPS unit may also report that the vehicle is leaving the rental lot location.

During the rental period, data may be collected, monitored, and transmitted by the TCU, in accordance with rental mode programming, as described elsewhere herein. At the conclusion of the rental period 470, for example, when the GPS unit detects that the vehicle has entered a rental facility, the TCU will inform the management system of the vehicle location and will report vehicle odometer and fuel level readings 480. This data may be used by the management system when it generates an invoice for the rental contract. Once the rental period has concluded, the TCU will check whether the vehicle is to remain in rental mode, or if it is to be toggled to the share mode 490. If the vehicle is to remain in rental mode, the TCU may confirm that the doors have been left unlocked. If the doors have been locked, the TCU may automatically unlock the doors.

Figure 5:
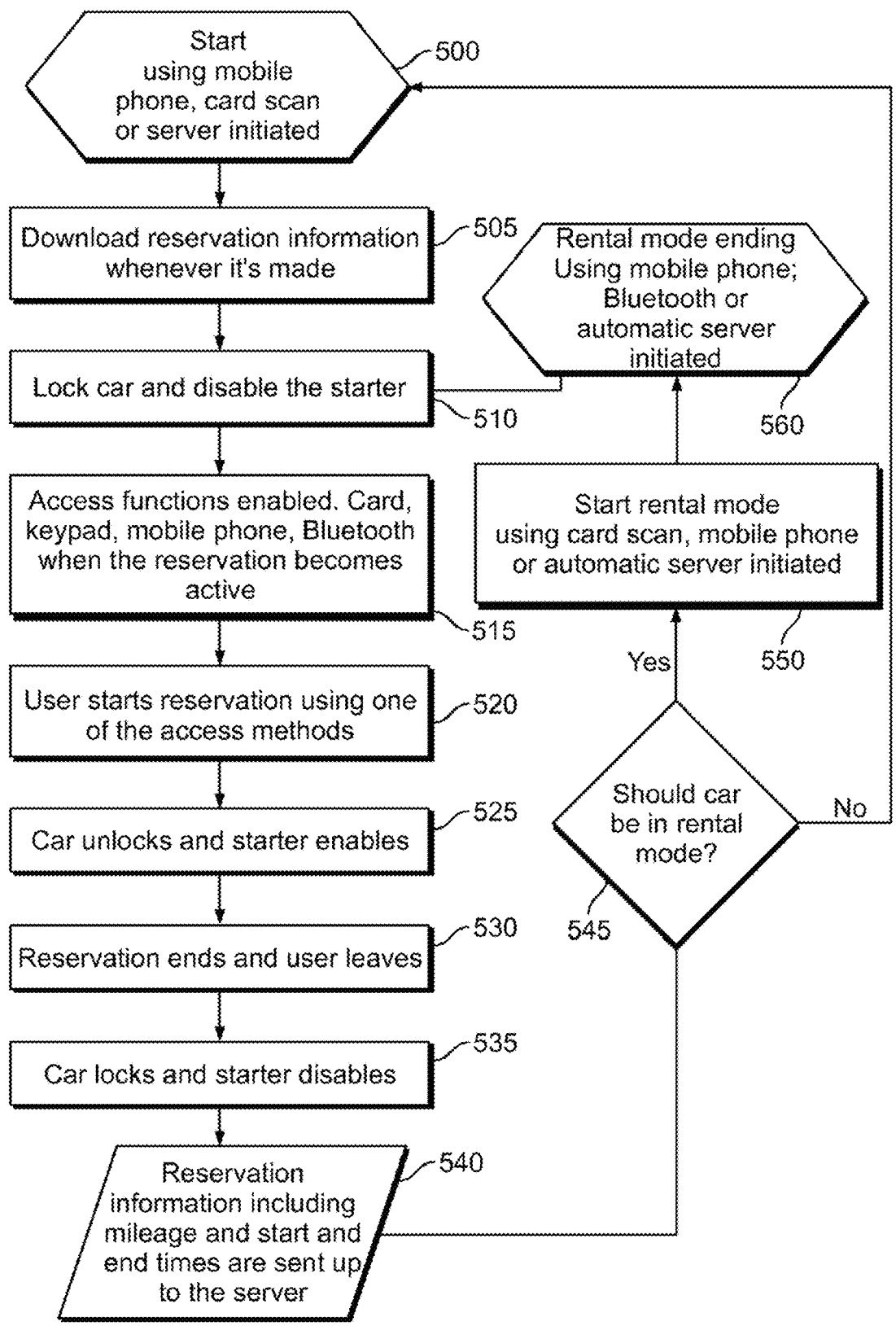
FIG. 5 is a flow chart of an exemplary method of operation pertaining to a vehicle in sharing mode in accordance with an embodiment of the present invention.

FIG. 5 shows an exemplary flow chart wherein a vehicle is toggled to and operating in a sharing mode. First, a sharing reservation 500 is received by the system. At the appropriate time, typically before a user seeks to access the vehicle, information about the reservation is downloaded to the TCU of the vehicle associated with the reservation 505. In this manner, the user associated with the reservation can access the vehicle with a card key (or other access device) at the appropriate time, even where the TCU is out of communication with the management system. If the vehicle is being put into sharing mode, the TCU locks the doors and disables the starter 510. At the appropriate time, the TCU enables sharing mode access functions 515, such as the card reader. When the assigned user seeks to access the vehicle using an appropriate access method 520, the share period starts. Access to the vehicle is provided and the starter is enabled 525. During the share period, data may be collected, monitored and transmitted by the TCU, in accordance with sharing mode programming. When the share period ends, and the user leaves the vehicle 530, the TCU ensures that the doors are locked and disables the starter 535. The TCU also transmits certain data to the management system 540, such as vehicle mileage, fuel level and reservation start and end times. Thereafter, the management system determines whether the vehicle is to stay in sharing mode 545. If so, the process is repeated for the next sharing reservation. If it is determined that the vehicle is to be toggled to the rental mode 550, programming associated with the rental mode is transmitted to the TCU so that vehicle operational functions, and desired TCU data collection and transmission protocols, can be initiated. Once the rental mode ends 560, the management system repeats the process of determining whether the vehicle is to stay in rental mode or be toggled to the sharing mode.

A user may access a vehicle and start a share reservation via a card key, a mobile device or other technology such as a fingerprint scan or entry of an appropriate code on an access panel. Once the TCU determines that the access attempt is valid and associated with the reservation, access will be permitted. The user can thereafter drive away in the vehicle. If the access attempt is not authenticated, such as where the card key is not authorized, access will not be permitted and the starter will remain disabled. If access is permitted, the TCU will inform the management system that access was gained via the method utilized, and that the vehicle has left the storage location. If the vehicle is in a garage, the TCU may be unable to communicate with the management system because a cellular connection is unavailable. In such case, the TCU may be programmed to permit access to and vehicle operation by the cardholder associated with the received reservation information, and will report access and operation to the management system as soon as communication is re-established. If communication is not re-established within a certain period of time after access and operation begins, further operation of the vehicle may be curtailed.

When a sharing reservation is concluded, the TCU will inform the management system where the vehicle is located and will confirm that the doors have been locked. In the event that the doors are not locked, or if the trunk is left open, the TCU may be programmed to flash the vehicle lights and/or honk the horn to remind the user to close the trunk and/or lock the doors. The doors may also be automatically locked by the TCU if the car is set to remain in sharing mode and the TCU determines that they are unlocked.

A vehicle TCU can be toggled into different modes in a variety of ways. The fleet management system can designate different vehicles for different programs according to demand, as reservations are taken for different programs or in advance based upon known demand patterns. For example, in New York City, business travelers utilize rental vehicles during weekdays and local residents utilize shared vehicles during weekends. In accordance with the present invention, vehicles can be toggled between both programs to accommodate this demand by designating certain vehicles for use in the sharing program during weekends, and for use in the rental program during weekdays.

The fleet management system may toggle a TCU upon command, such as when a user without a reservation arrives at a facility to rent or share a vehicle. A TCU may also be toggled in response to a user action, such as when a fleet management employee with certain privileges tries to access a vehicle via the card reader. If the card holder has appropriate privileges, the vehicle may be toggled to the appropriate mode automatically by the TCU, and access provided immediately. The mode can also be changed by fleet personnel via Bluetooth or NFC enabled mobile technology. Further, the mode can be set automatically based upon the location of a vehicle via RF or cellular communication between the TCU and the facility or the management system, such as when a vehicle arrives at a location associated with a particular program.

It is envisioned that the TCU could be set for additional modes, including modes not described herein. In each case, sensor data and communication appropriate for that mode may be collected and transmitted by the TCU. For example, a vehicle might be toggled for use a corporate or municipal pool for a certain period of time. In these modes, the TCU can enable (or preclude) vehicle access via an access card. Programming might not require transmission of fuel level data to the management system, as such data might not be necessary for vehicles assigned to a corporate pool for a period of time. On the other hand, a mode could be created for a specific entity wherein fuel level data is electronically reported to that entity after each use of each vehicle so that the entity can manage refueling of all vehicles in the fleet.

If a vehicle is operated as part of a corporate fleet, or is operated in regions of the country or world where travel into certain areas is restricted, such as locations near a border, the TCU mode can utilize geo-fencing to ensure that the vehicle is operated only within permitted regions. In the event such programming is implemented, and a user seeks to take a vehicle to a region that is not permitted, the management system will detect this movement via the location provided by the GPS unit, and a violation of the "fenced" territory can be triggered. Further, via two-way communication with the TCU, the management system could prohibit such travel, for example, by immobilizing the vehicle if a user enters prohibited territory. Geo-fencing could be executed within the TCU, if sufficient memory and processing capability is provided, or within the fleet management system, working in conjunction with GPS data supplied by the TCU. For certain types of fleets, GPS could be used, consistent with applicable laws and disclosure requirements, to monitor or track routes taken by drivers, or the timing of certain activities, which may be essential information in a corporate or municipal program.

If the vehicle is to be used outside the United States, such as in the European Community, laws and current practices may require different programming. For example, in certain countries, it is essential that vehicle doors remain locked whenever a vehicle is parked. In other countries, users may access a vehicle with a card key, and subsequently access a vehicle with a key stored in a storage compartment within the vehicle. Further, collection and transmission of certain reservation data, location data, or driving habits may be restricted in certain parts of the world. By toggling the vehicle TCU to a mode created specifically for use of the vehicle in such country or region, the invention enables a fleet manager to comply with such laws and practices as needed, while not restricting the use of the vehicle to that location or program. As can be seen, use of a programmable TCU, which can operate in different vehicle modes to provide different TCU functionality at different points in time on a vehicle by vehicle basis, enables a single fleet of vehicles to be used in a variety of different vehicle programs. This enables the fleet owner to more efficiently manage use of fleet vehicles.

Figure 6:
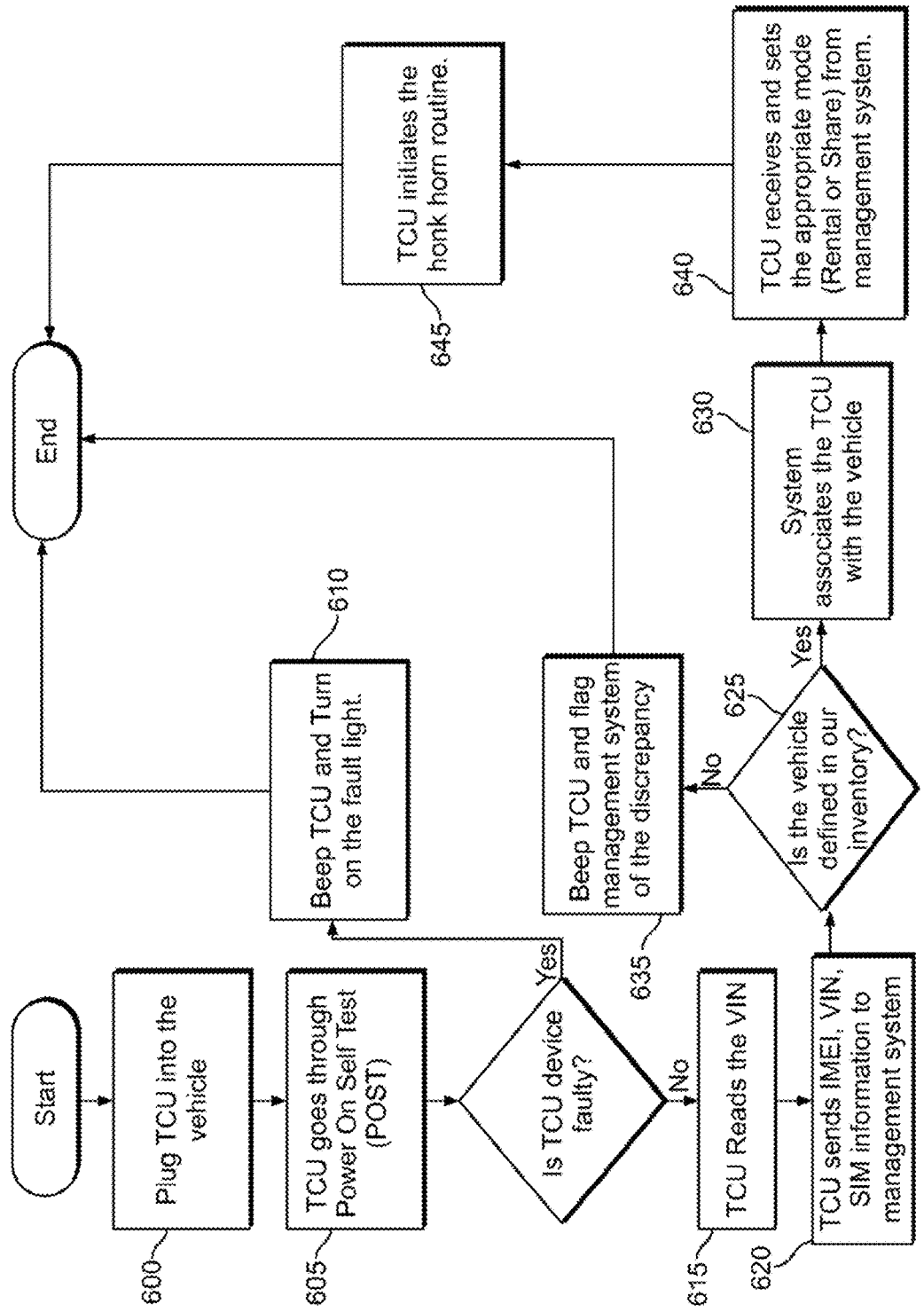
FIG. 6 is a flow chart of an exemplary method of installing a TCU.

FIG. 6 provides an exemplary flow chart showing the steps that may be undertaken to install and activate a TCU. First, the TCU is attached beneath the vehicle dashboard and plugged into the vehicle 600. Next, the TCU will initiate a power on self-test 605. If the device is faulty, a fault light or alarm is activated 610. If the TCU passes the test, the TCU will read vehicle VIN information 615. Next, the TCU transmits the VIN, together with TCU IMEI and SIM information, to the management system 620. In the alternative, the system may check for a difference between that VIN and the last VIN on record in the TCU. If there is no change in VIN, no further action is taken.

In the management system, it is determined if there is a vehicle corresponding to the VIN in the fleet inventory 625. If so, the management system will associate the TCU with the appropriate vehicle 630, and transmit appropriate instructions to operate the TCU in the vehicle make and model in which it is installed. If the VIN is not recognized, or if the IMEI or SIM is not recognized, the system flags the TCU data for further evaluation and notifies the installer of the discrepancy 635. Thereafter, the management system sets the TCU mode 640, and notifies the installer that installation is complete 645. The TCU may inform the installer that installation is complete via certain actions in the car, such as flashing the lights, changing the status of a TCU LED, or activating the car horn.

Figure 7:
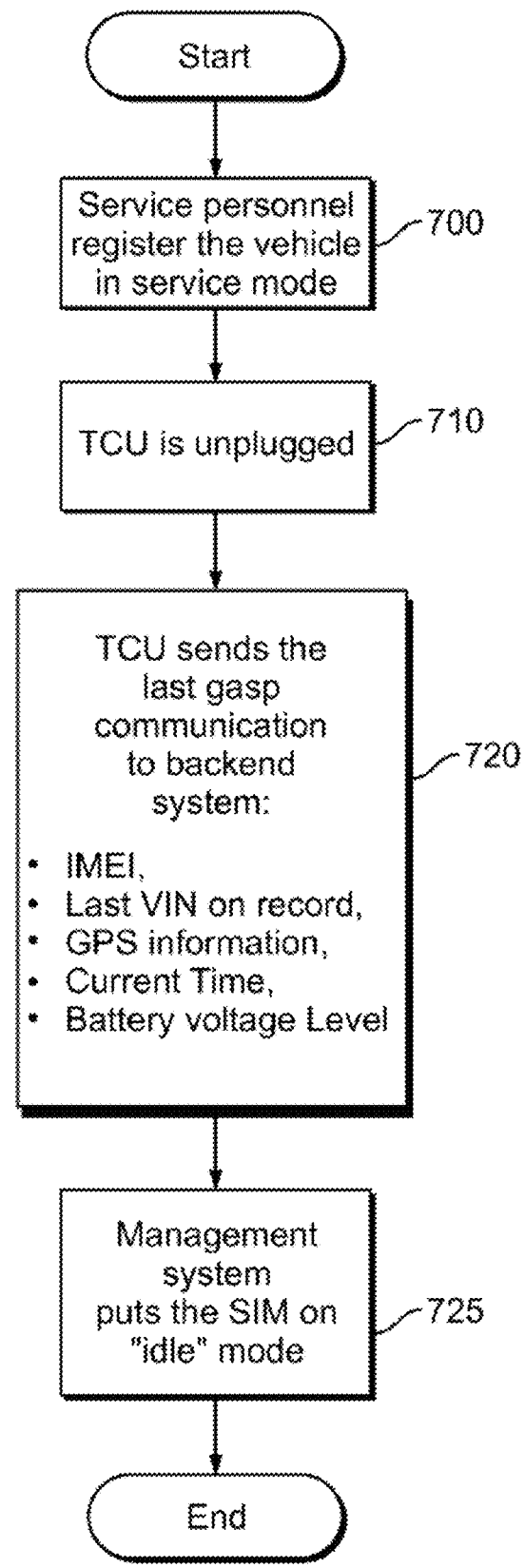
FIG. 7 is a flow chart of an exemplary method of re-installing a TCU.

FIG. 7 depicts a chart showing de-installation of a TCU. When a TCU is to be disconnected, service personnel would normally inform the management system that the vehicle is going into a service mode 700. When the TCU is unplugged from the vehicle 710, the TCU transmits a signal to the management system noting that it has been unplugged, along with the last VIN on record, the TCU IMEI, the current time, the battery voltage and GPS location 720. The management system thereafter verifies that disconnection was intended. If so, the TCU is listed in a table of TCUs not currently installed. Where intended, the SIM associated with the TCU may be placed in an idle mode, so that further data charges are restricted 725. If TCU disconnection was not authorized, the disconnection can be flagged for further action.

Figure 8A:
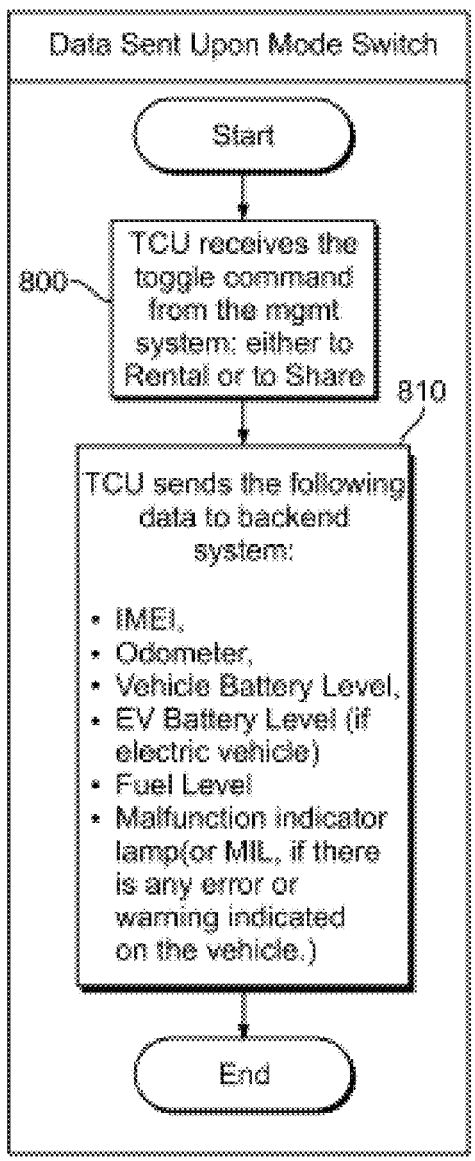
FIGS. 8A and 8B illustrate data transmission of an exemplary mode of operation.
Figure 8B:
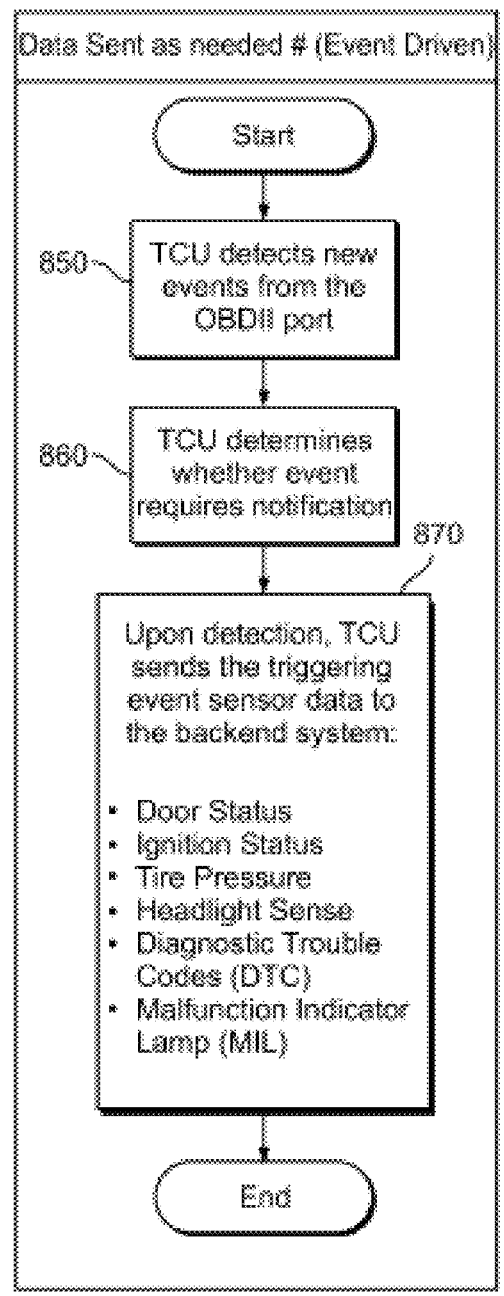

FIGS. 8A and 8B depict representative data that may be communicated by the TCU upon mode switch, or as needed, respectively. As shown in FIG. 8A, a TCU may be programmed so that when it is toggled to a mode 800, such as rental mode or share mode, it will transmit certain data and information 810, including, but not limited to, the following: IMEI, odometer reading, vehicle battery level, fuel level, and malfunction indicator lamp. The TCU can be programmed to transmit the same or different data when the TCU is first put into a new mode, depending on system needs and the data desired in such mode. As depicted in FIG. 8B, the TCU may be programmed to transmit certain data and information on an event driven basis. At 850 the TCU detects a new event. The TCU determines, according to TCU programming, whether that event needs to be transmitted to the management system 860. If the event needs to be transmitted, the TCU sends the sensor data (including any additional data that programming requires it to send) to the management system 870 along with the TCU IMEI information or the vehicle VIN. The TCU may send additional relevant data, such as, but not limited to, door status, ignition status, tire pressure, headlight sense, diagnostic trouble codes, and malfunction indicator lamp status.

FIG. 9 depicts exemplary steps undertaken by the invention in connection with command-response communications through which a user or a system administrator may remotely command the TCU to take some action. In this example, a request can be made by a user 900 via a mobile device in communication with the TCU 905, via communication between the user and the fleet management system 910, or via communication between the user and a person having administrator privileges 915. A person with appropriate privileges 915 could also initiate a command via the fleet management system 910 or via a RF command. Once a command is initiated, it is communicated to the TCU 930 directly via local communication, or via a cellular network connection 920/925. The TCU then executes the command via the OBD II port connection 940 or via hard-wired circuit connection 935. These connections enable the TCU to obtain sensor data or activate a vehicle device or system 945, such as door locks, vehicle lights, the horn, and the like. Once the command is activated, the TCU may also confirm that the command has been activated and provide responsive or confirmation information, such as sensor data or system status to the management system. Thus, the TCU may report that the doors are locked/unlocked, the lights have been flashed, the horn activated, and the like.

Command-response actions may be limited in accordance with the operable TCU mode. For example, in rental mode, users may be prohibited from activating commands, or certain administrator commands may be prohibited, such as locking of doors or activating the alarm. The fleet management system may also prohibit certain command-response actions by location. For example, a facility manager in one location may be precluded from initiating certain actions or obtaining data from a TCU in a vehicle located at a distant location.

The data communicated by the TCU enables a fleet operator to manage the vehicle fleet in numerous ways. For example, sensor status and data can be transmitted by the TCU modem via the cellular network to the fleet management system where it can be accessed, analyzed, and shared with the other systems. For vehicles in a rental fleet, or when vehicles are being operated in a rental mode, ease of access can be assured, and applicable data such as fuel level and mileage can be automatically sensed and transmitted to the management system, integrated into a vehicle rental record, and incorporated into a rental invoice generated at the conclusion of a rental, thus removing the requirement that a rental system employee manually check the fuel status and mileage.

Where vehicle sensors detect vehicle components requiring maintenance, such as a low battery indication, the fleet management system can interface with electronic maintenance and repair systems to schedule the vehicle for appropriate and timely maintenance or repair, as described below. The system can also ensure that no reservations are made for that vehicle during the period of scheduled maintenance. Notification of repairs needing immediate attention can also be provided to the user.

If certain sensors indicate a vehicle emergency has occurred, such as a collision, the management system can detect these conditions and notify fleet administrators so that appropriate action can be taken, such as notifying authorities. In the event that an emergency is detected, GPS location data can be automatically transmitted, or requested and obtained from the TCU, so that local emergency responders can be dispatched to the vehicle location reported by the GPS system.

Where accelerometer readings exceed thresholds, the TCU can communicate this information to the management system, where further analysis of sensor data can be undertaken to determine where the user has engaged in inappropriate driving behavior. If so, the management system may then flag the vehicle for physical inspection for evidence of vehicle misuse or damage. The fleet management system may also store sensor data and other information in order to evaluate driver behavior and driving characteristics for a wide variety of purposes. For example, this data could be used for a rating system, in which future vehicle pricing or insurance coverage requirements are based upon behavior patterns noted for a particular type of vehicle, in a given location, at a given time of year. Consistent with current law and disclosure requirements, such data could be used for preferred pricing, discounts and other bonuses for drivers who exhibit safe driving characteristics. Similarly, drivers who exhibit certain behaviors may be barred from future vehicle use, or may be notified that inappropriate or improper use of the vehicle has been detected.

Sensor data may also be used to monitor vehicle performance for maximizing fleet economics. Vehicle operational data and information, such as oil sensor data and fuel economy readings, may be utilized in connection with fleet vehicle maintenance. Vehicle use conditions can also be monitored such that vehicles driven in heavy traffic, or in geographic regions with excessive dust, can be scheduled for more frequent maintenance. Sensor data can also be used in connection with economic decisions, such as determining which vehicles are subject to greater abuse or higher accident rates. Such information can be used by the fleet owner in connection with vehicle use pricing decisions, vehicle and user insurance decisions, and in determining whether certain vehicles should be discontinued from a fleet.

Programmable two-way communication between the TCU and the management system further enables the fleet operator to provide numerous value-added services for fleet customers. For example, for electric vehicles in a fleet, the TCU can monitor battery levels and remind a user via a mobile device when a charge is required. If so, the system may direct the user to a nearby charging location. The TCU can also report battery levels to the management system, enabling the management system to determine whether the vehicle will need to be recharged before it is provided to the next user. In sharing mode, the management system may utilize battery level information to direct the user to an available charging location at the time of vehicle return to ensure that vehicle charging takes place in advance of the next use of the vehicle. If the user cannot locate a vehicle, the TCU can be commanded to activate the car lights or the horn. In the event that a parking space is not available to a share customer seeking to return a vehicle, the TCU and/or the management system may detect the location of the user via the GPS system, and direct the user to a nearby alternate lot. The management system could also utilize vehicle GPS data transmitted through the TCU to direct a user to nearby available parking spaces during a rental or share period. The system could provide similar notification for available nearby fleet facilities, such as cleaning or maintenance facilities. Finally, in-vehicle systems such as a satellite radio system, a GPS/navigation system, or an entertainment system may be activated remotely via management system communication with the TCU, such as where there is a wired or wireless connection between the in-vehicle system and the TCU, including the vehicle CAN bus and OBD II port.

One skilled in the art will appreciate that the fleet management system described herein can utilize servers and databases located on one or more computers and in storage media and devices at one or more locations, including a central computing system, such as a mainframe computing system, or a distributed computing environment where various tasks are performed by remote processing devices that are linked through a communications network. These can include public, private, or hybrid cloud computing network environments. In a distributed computing environment, program modules can be located in both local and remote computer systems, and in storage media and devices. The management system can operate in a networked environment using logical connections to one or more remote computing devices, such as, for example, a personal computer, a portable computer, a mainframe computer, a server, a network computer, a cloud-based application or computing device, a mobile device, a peer device or another common network node, and so on. Logical connections between the computer and a remote computing device can be made via a local area network (LAN), a wide area network (WAN), or the Internet.

Vehicle Use Operations

The present invention further comprises one or more systems for vehicle use operations, including, but not limited to, enrolling or registering users, scheduling or reserving vehicles for approved or authorized users, monitoring the vehicle while being used, predicting vehicle arrival or return times and locations (including the identification of likely late returns), and processing vehicle returns. Types of users vary depending on the nature of the fleet. For example, users may be employees of the owner of a corporate or municipal utility fleet, authorized drivers of a bus fleet, drivers of taxi-cabs, renters or customers of a car rental agency, or members of a car sharing service. Accordingly, the types of vehicle use operation systems used above will vary as well.

In several embodiments, the present invention comprises a user enrollment or registration component. This component reviews potential users backgrounds and qualifications, including, but not limited to, user training, licensure reviews, background checks, and credit checks, as appropriate. In some business models, enrollment may comprise an application and acceptance as a member of a car sharing or similar service. Advertising or other means of solicitation of potential users may be included. In some cases, users may not be previously enrolled prior to an initial reservation or use, and some or all of these checks may be performed at the time the user reserves a vehicle or initially takes possession of a vehicle. Users of a particular fleet may be divided into different categories or classifications (e.g., a preferred or frequent driver program for a car rental company, or users licensed for certain types of vehicles).

The present invention further comprises a vehicle scheduling or reservation component. This comprises both user-facing and internal fleet system elements. Examples of a reservations interface for a user to identify available vehicles and make a reservation are provided in U.S. Pub. No. 2013/0226633 (published Aug. 29, 2013 by Zipcar, Inc.) and U.S. Pub. No. 2011/0060480 (published Mar. 10, 2011 by Zipcar, Inc.), which are incorporated herein by specific reference for all purposes.

In several exemplary embodiments, the present invention comprises a multi-tiered fleet management reservations database caching system, as described in U.S. Pat. No. 9,576,254 (issued Feb. 21, 2017 to Zipcar, Inc.), which is incorporated herein by specific reference for all purposes. As described therein, a database on a first computing system contains operational status data describing whether each particular object or asset (e.g., a vehicle in a connected fleet) is functionally operational, and reservation data describing the availability of that object for a reservation by a pre-authorized user, such as a member of a vehicle sharing service. A first caching level, implemented on the first computer system, creates a first cache of dense, time-windowed data by receiving, from the database, operation status data and reservation from a window or period of time, and converting the data to form windowed denser data. A second caching level, also implemented on the first computer system, creates a second cache of compact data by storing the dense windowed data from the first cache in a simple set data structure. A plurality of third caches are then created by copying the second cache, and are subsequently provided to one or more application computing systems separate from the first computer system, thereby allowing a connected end user with a computing device to access the data in a third cache without accessing the first computer system. The system is managed and updated such that the amount of time that data in the caches is different is minimized.

The present invention further comprises a vehicle access component, that also may both user-facing and internal fleet system elements. This may be part of the reservations system, or work in conjunction with a reservations system. The user seeks access in a variety of ways, including, but not limited to, obtaining keys to the vehicle from a car rental agent, presenting an authorized user card to a card reader in the vehicle, or using a mobile computing device to communicate with a TCU or dedicated access unit in the vehicle, as discussed above. Examples of access control systems are disclosed in U.S. Pat. No. 9,442,888 (issued Sep. 13, 2016 to Zipcar, Inc.) and U.S. Pat. No. 9,635,518 (issued Apr. 25, 2017 to Avis Budget Car Rental, LLC), which are incorporated herein by specific reference for all purposes.

In cases where the user is attempting key-less access to a connected vehicle, such as by wireless communication with a user's mobile computing device, there are several methods to determine whether to allow access. In some cases, access may be permitted if the user is a pre-authorized registered user and presents a general access code or authorization to the vehicle. In other cases, reservation data (either for a single reservation or for reservations over a period of time, which can be a day or several days) has been previously electronically communicated to the vehicle (e.g., transmitted to a TCU in the vehicle) and stored therein, and access is permitted if a user attempting access matches corresponding reservation data (i.e., user identity, time period, and the like). Alternatively, after receiving an access request from a user, the vehicle (i.e., through TCU or similar unit) electronically communicates with the fleet management system to confirm whether or not to allow access. In cases where the vehicle cannot establish direct communication access, it may attempt to establish communication through other connected vehicles, through the user's mobile device, or other wireless access points.

In some cases, such as an underground garage or parking area, the vehicle and user's computing device may be unable to establish outside communications links in any fashion. In several embodiments, the fleet management system of the present invention previously provides a protected, secure, single-use token to the user's computing device upon making a reservation (or close to the starting time of the reservation), which is then securely communicated to the vehicle. The vehicle processes the token and allows access if the information in the token is valid.

After access is allowed, the period of use commences. During use, as described above, the connected vehicle (or a TCU or a similar unit in the vehicle) provides various types of information to the fleet management system. The fleet management system may directly or indirectly monitor some or all of the period of use.

In several embodiments, the fleet management system monitors the period of use for emergency situations, which may be reported by the user through the user's mobile devices or a unit in the vehicle, or reported automatically by the vehicle through its sensors, as described above. Communications can be established directly with the user, and road-side assistance or emergency response may be called and provided. If communications cannot be established directly with the user, and depending on the information available from vehicle or TCU sensors, road-side assistance or emergency response may be automatically called.

In several embodiments, the user may communicate an incident or accident in real-time during the use period. Information may be gathered in real time, including descriptions and pictures of any damage to the vehicle. This information can then be provided to the fleet management system's servicing or maintenance components for advance planning and scheduling prior to return of the vehicle.

The fleet management system further provides predictive modeling to determine when a vehicle will arrive at one or more destinations or stopping points. This may be used, for example, to provide accurate determinations of when a vehicle, such as a shuttle bus, will arrive at a particular stop or terminal. It may also be used for the early detection of a possible late return of a vehicle, as described in U.S. Pub. No. 2013/0246102 (published Sep. 19, 2013 by Zipcar, Inc.) which is incorporated herein by specific reference for all purposes.

Depending on the size of the fleet, tracking the location of all vehicles in the fleet requires processing an extremely large amount of data, which may exceed processing capabilities for a particular system or may unacceptably slow operational speed. In these cases, the system may actively focus on vehicles based on time and/or distance parameters. For example, the current location and speed of a vehicle may only be polled within a set period (e.g., one hour, two hours, or similar threshold) of an expected or scheduled arrival or return time. Alternatively, or in addition, the system may identify a vehicle of interest based on the relative distance from the nearest location where the vehicle may be returned, such as car rental return location.

Figure 10:
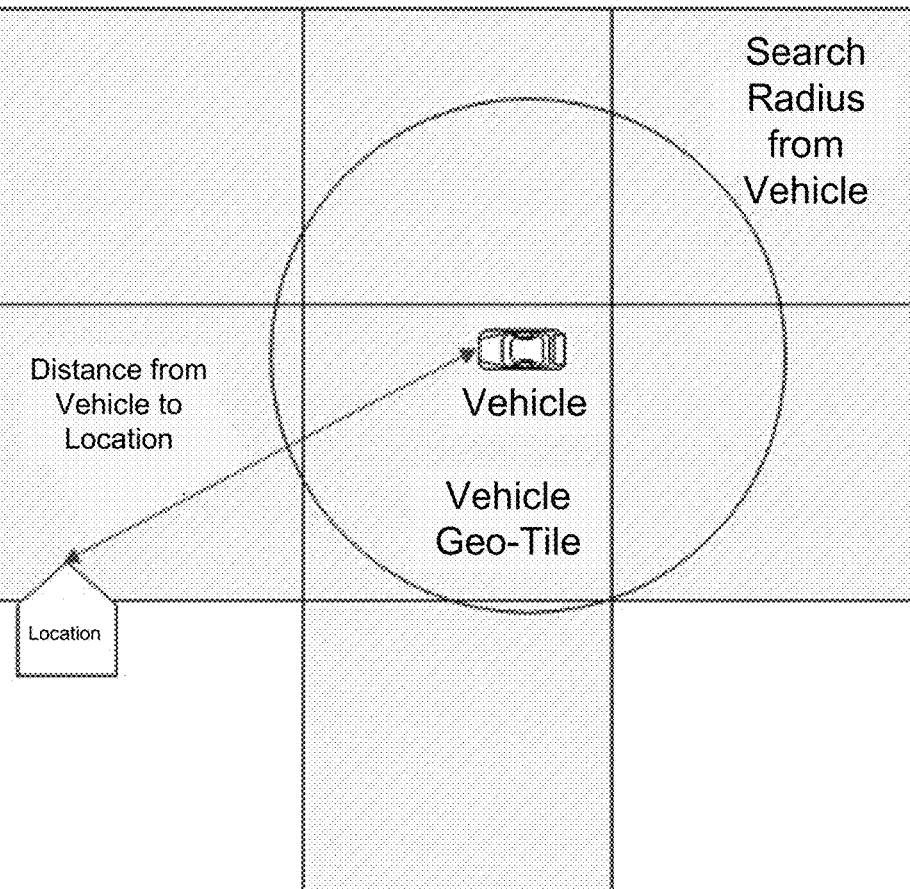
FIG. 10 is a diagram of the geo-tile location determination system.

In one embodiment, the present invention uses a predictive geo-tile location algorithm to determine the distance of a vehicle from any relevant connected fleet location (such as a car rental return location), and notify the vehicle when it next needs to send location coordinates based on the relative distance from the nearest such location. As seen in FIG. 10, this embodiment creates pre-determined "geo-tiles" on a map, and determines the particular geo-tile that a vehicle is in based on the most recently received GPS coordinates from the vehicle. It then determines all adjacent geo-tiles that are within a predictive search variable radius around the current vehicle location. It then determines if a relevant connected fleet location is found within any geo-tile within that radius. If so, the system determines if the vehicle is within any particular geo-fence location (e.g., a parking lot at a car rental return location). If the vehicle is found in a known geo-fenced location, appropriate return action is taken (e.g., the car rental return location is notified, and the return/check-in process is enabled). If the vehicle is not within a known geo-fenced location, the system then determines the distance to the closest fleet location, determines the next polling interval (i.e., the time when the vehicle should next send vehicle GPS location data) based on that distance, and notifies the vehicle of the polling interval. In general, shorter distances require shorter polling intervals.

If no relevant connected fleet location is found with any geo-tile within the predictive search variable radius, then the system sets the polling interval to a longer period based on the size of the radius. In general, larger radii call for longer polling intervals.

The present invention further comprises vehicle return applications or components, which handle, among other things, determination of the vehicle status and condition, invoicing of the user (where appropriate), and forwarding of the vehicle for any servicing, maintenance or repairs that may be required. These also may comprise user-facing and internal fleet elements.

In several embodiments, the system comprises a vehicle return application or component, which can take the form of an application on a mobile computing device, such as that described in U.S. patent application Ser. No. 15/934,887, filed Mar. 23, 2108, which is incorporated herein in its entirety for all purposes. The return application is used to process the return of a fleet vehicle, including the detecting and recording (such as by digital images or videos) of damage to the vehicle (internal or external), and the need for maintenance of one or more vehicle components or systems. The user can indicate specific external damage locations on a diagram, and can interactively choose the components damaged. In some embodiments, a smart vehicle detection and recording process is used. Incident or accident reports can be digitally recorded, in order to avoid the rekeying of data where possible.

In several embodiments, the system may automatically, in real time, calculate a damage charge to add the user or customer's invoice at the time of return. The mobile device may be used to capture the electronic signature of the customer or user returning the vehicle, including the damage charge. A receipt can be emailed to the customer. The system then performs, in real time, an automated comparison of the vehicle condition against an established vehicle standard or standards, such as, but not limited to, a vehicle rentable standard or a vehicle operating standard. When the established vehicle standard is not met, the vehicle is automatically placed "out of service." If a rental fleet vehicle, for example, the vehicle then cannot be rented.

The system then performs, in real time, an automated comparison of the vehicle condition against an established vehicle standard or standards, such as, but not limited to, a vehicle rentable standard or a vehicle operating standard. When the established vehicle standard is not met, the vehicle is automatically placed "out of service." If a rental fleet vehicle, for example, the vehicle then cannot be rented. The system may then automatically direct the vehicle to servicing, maintenance or repair, as necessary, based on the vehicle condition information.

Vehicle Servicing, Maintenance and Repair

In several embodiments, the present invention comprises a servicing scheduling component, which provides servicing staff with schedules or task lists of various services that are required for one or more vehicles. The servicing staff member notifies the system when the task or tasks for a particular vehicle have been completed. In several embodiments, a maintenance application receives information from the return application identifying maintenance or repair issues. In additional embodiments, the maintenance application allows the capture of maintenance and/or damage problems or issues that arise outside of vehicle rental or use, and thus would not be captured by the vehicle return process.

The system then automatically creates a repair or maintenance order based on the vehicle condition information (including information gathered upon vehicle return, if applicable). The system may automatically direct a repair to the most cost effective supplier based on the total cost and other parameters of the repair, including, but not limited to, repair time, logistics, expenses, and similar factors.

Figure 11:
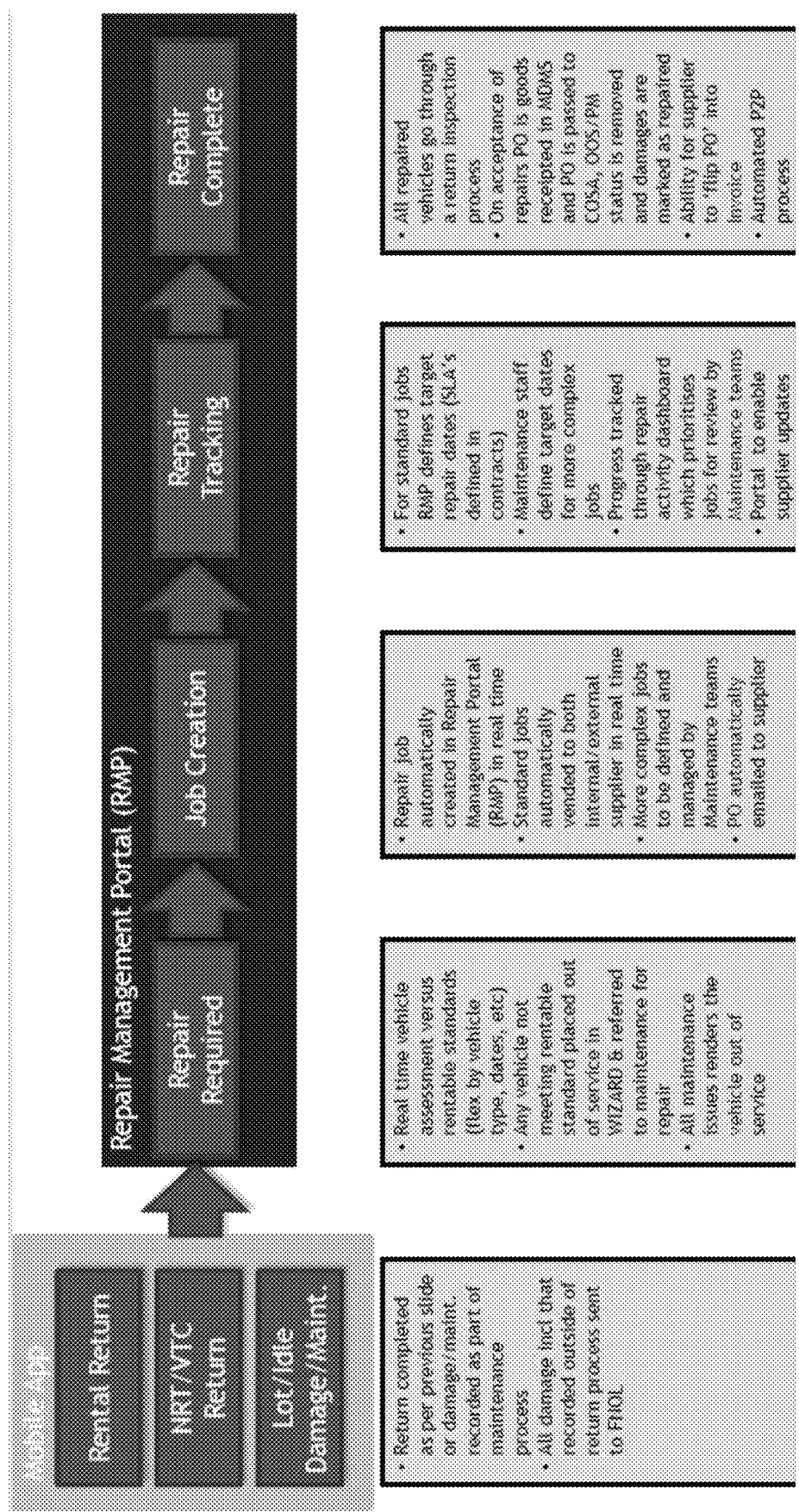
FIG. 11 shows a view of the return and repair management portal process in accordance with an embodiment of the present invention.
Figure 12:
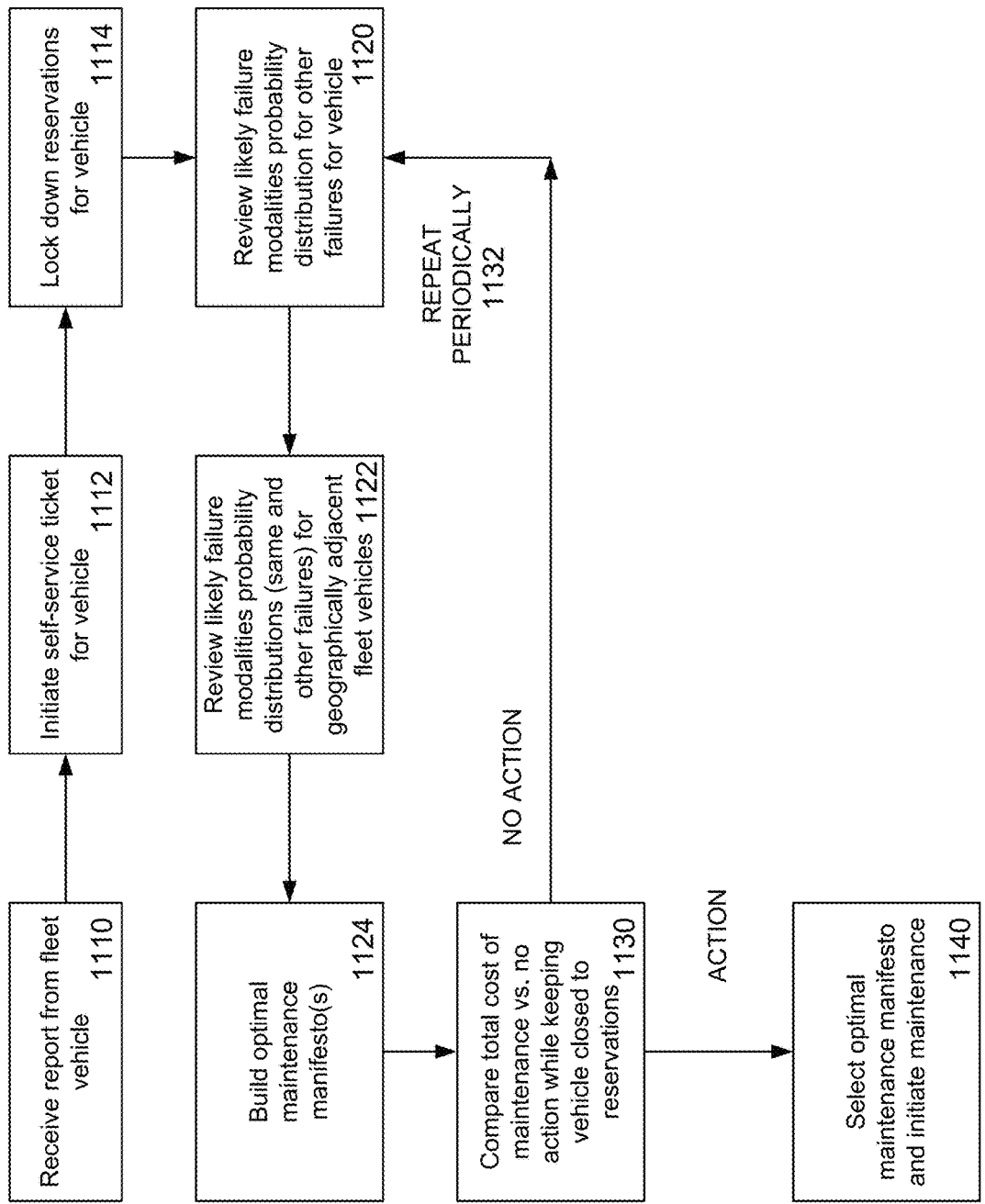
FIG. 12 shows a diagram of an exemplary distributed maintenance system.

A vehicle repair may be managed through the repair management portal (as seen in FIG. 11). The system allows users to obtain quotes for work, review and execute work and purchase orders, review and approve invoices (including e-invoices), evaluate supplier performance, and perform similar tasks. The system can prepare and display a prioritized "to-do" list of maintenance and repair tasks, and track all work performed and completed (including, but not limited to, a post-repair or post-maintenance inspection). Documentation of system tasks and functions is maintained automatically.

In several embodiments, the system can automatically decide the order of repair or maintenance (e.g., what gets repaired, when it gets repaired, and how it gets repaired). The system also can interact with business operation systems (such as a rental fleet management reservation system) to tactically address and possibly release additional vehicles at peak times as needed.

The system of the present invention thus provides the ability to track vehicle condition at each vehicle movement or check-points, and helps avoid missed damage and damage charges. It avoids the manually-intensive and inefficient rekeying of incident and damage details multiple times, thereby providing an efficient system to track and manage vehicle damage repair. It speeds the overall repair process, particularly removing inefficiencies caused by delayed handover of vehicles to various members of the supply chain. It further provides a consistent standard for vehicle rental or operating condition, which can be automatically determined, resulting in an improved customer experience.

Distributed Fleet Vehicle Servicing, Maintenance and Repair

In several exemplary embodiments, the present invention comprises a system using probabilistic models of failure dynamically in real time to determine and dispatch servicing, maintenance and repair services to connected fleet vehicles, particularly where the connected fleet is distributed. Servicing and maintenance of vehicle in a distributed fleet (e.g., shared vehicle or autonomous vehicle fleets, where vehicles are distributed among several possible locations between uses by a customer, member or other user) presents unique challenges compared to service and maintenance of vehicles in a more traditional hub fleet (e.g., rental fleets, where vehicles are located at a home hub between uses by a customer or other user). Because hub fleet vehicles are returned to a home hub after each rental, routine maintenance can be optimally scheduled, and identification and addressing of servicing and maintenance issues or problems can be more easily and quickly handled, typically there at the hub location itself. In addition, a fleet staff member typically has the opportunity to inspect and drive the vehicle in or between the hub lots between customer rentals, acting as an intuitive human sensor in addition to connected vehicle-based sensors and self-reporting.

Vehicles in a distributed fleet do not have these advantages, as they often are subject to serial use, typically for relatively short periods of time (i.e., less than a day) with no or limited servicing between uses. In many cases, by the time a problem manifests itself, it is during use by a customer or member of the vehicle sharing service. In addition to requiring higher cost emergency servicing or maintenance to respond to the problem, and higher overall use and "churn" of fleet vehicles, the circumstances result in an unhappy or upset customer or member (and subsequent customers or members who had planned to use the vehicle with the problem), which can adversely impact fleet use and revenues. More frequent preventative maintenance decreases vehicle problems during use, but greatly increases expense due to the costs associated with shuttling the vehicle more frequently to a maintenance/repair center, lost revenues from the vehicle not being available for rent, and possible additional costs from increasing the number of vehicles in the fleet to offset the lower time of availability for each vehicle.

The present invention combines self-reporting and self-management of a connected fleet vehicle (with on-board and installed sensors configured to identify actual or potential issues or problems in the vehicle, and report, request, and obtain/dispatch servicing via its cloud or network communications interfaces), and predictive failure algorithms (based on historical and current connected fleet vehicle data), with multiple probabilistic distributions for the distributed fleet to dynamically, in real time, determine and dispatch service with greater efficiency and lower costs for fleet operations.

In several embodiments, each fleet vehicle possesses several probabilistic distributions, including, but not limited to, the following:

a. A distribution representing the optimal maintenance window or windows for the fleet vehicle.

b. A distribution representing likely failure modalities for the fleet vehicle, assuming no maintenance.

c. A distribution representing likely revenues predicted for the fleet vehicle over a particular time period (e.g., the next month or 30 days).

These distributions are continually or periodically updated for each fleet vehicle in the fleet management system.

When a particular fleet vehicle self-reports 1110 an actual or predicted problem or issue, the fleet management system implements the following process:

a. The system initiates a self-service ticket for the vehicle 1112.

b. The system locks down further reservations for the vehicle 1114.

c. The system reviews the likely failure modalities probability distribution for other failures for the self-reporting vehicle 1120.

d. The system reviews the likely failure modalities probability distribution for other fleet vehicles 1122 that are geographically adjacent to the self-reporting vehicle (where being "geographically adjacent" can be determined based on a distance, radius, or defined geographic area) for both (i) the problem or issue that was self-reported, and (ii) other failures for the geographically adjacent vehicles.

e. The system them attempts to build one or more optimal maintenance manifestos 1124 across multiple fleet vehicles in an area (which may be a part of, equal to, or greater than the "geographically adjacent" area) that solves for the following factors:

(1) Total cost of the maintenance manifesto (across multiple fleet vehicles in the area).

(2) Total expected downtime (across the multiple fleet vehicles).

(3) Minimization of any cancelled reservations (or reservations to be cancelled).

f. The system compares the total cost of maintenance with the cost of taking no action while keeping the vehicle closed to reservations 1130.

g. If the system selects the option of taking no action while keeping the vehicle closed to reservations, the system periodically repeats 1132 (e.g., every X hours) the above calculations with updated probability distributions. If the self-reporting vehicle is still offline (i.e., closed to reservations) after a particular time period, the system escalates the problem or issue to a fleet manager.

h. If the system selects the option of taking maintenance action, the system selects the optimal maintenance manifesto, and initiates dispatching of the vehicle(s) to known distributed maintenance providers 1140.

Vehicle Allocation and Transfer

In several embodiments, the present invention provides for pro-active fleet planning and management of existing vehicles. Various predictive programs are used to determine vehicle use patterns and trends over various time periods, and the system may direct the movement of various fleet vehicles from one location to another location based on these predictions. Fleet movement may be accomplished by bulk transport means (e.g., multiple vehicles loaded on a truck), or by strategic pricing for users seeking to pick up a vehicle at a first location and drop it off at a second location. In the latter case, the system may provide strategic pricing for particular vehicles that the system determines should be moved to the second location.

Fleet vehicles also may be transferred from fleet to fleet, or between components of a fleet. A TCU or similar unit as described above enables the rapid and easy transfer of a vehicle between fleets or components. Examples of systems and methods for sharing vehicles between fleets are disclosed in U.S. Pub. No. 2015/0294403 (published Oct. 15, 2015 by Zipcar, Inc.), which is incorporated herein by specific reference for all purposes.

Fleet vehicles also may be removed from a fleet, and returned to a lessor or manufacturer, or sold to a third party. In these circumstances, the system conducts an analysis of the vehicle condition, and compares to pre-established sales standard (for a third-party sale or auction), or a pre-established lessor or OEM return standard. Necessary servicing, maintenance or repairs may be conducted in a similar manner as described above for servicing, maintenance or repairs during normal operations.

Connected User Interaction, Applications and Interfaces

More detailed information about interactions between connected users and a connected fleet management system as described herein (including user applications and interfaces), and examples thereof, are disclosed in the co-pending U.S. patent application Ser. No. 15/986,504, filed May 22, 2018, and Ser. No. 15/986,528, filed May 22, 2018, which are incorporated herein in their entireties by specific reference for all purposes.

In order to provide a context for the various computer-implemented aspects of the invention, the following discussion provides a brief, general description of a suitable computing environment in which the various aspects of the present invention may be implemented. A computing system environment is one example of a suitable computing environment, but is not intended to suggest any limitation as to the scope of use or functionality of the invention. A computing environment may contain any one or combination of components discussed below, and may contain additional components, or some of the illustrated components may be absent. Various embodiments of the invention are operational with numerous general purpose or special purpose computing systems, environments or configurations. Examples of computing systems, environments, or configurations that may be suitable for use with various embodiments of the invention include, but are not limited to, personal computers, laptop computers, computer servers, computer notebooks, hand-held devices, microprocessor-based systems, multiprocessor systems, TV set-top boxes and devices, programmable consumer electronics, cell phones, personal digital assistants (PDAs), tablets, smart phones, touch screen devices, smart TV, internet enabled appliances, internet enabled security systems, internet enabled gaming systems, internet enabled watches; internet enabled cars (or transportation), network PCs, minicomputers, mainframe computers, embedded systems, virtual systems, distributed computing environments, streaming environments, volatile environments, and the like.

Embodiments of the invention may be implemented in the form of computer-executable instructions, such as program code or program modules, being executed by a computer, virtual computer, or computing device. Program code or modules may include programs, objects, components, data elements and structures, routines, subroutines, functions, and the like. These are used to perform or implement particular tasks or functions. Embodiments of the invention also may be implemented in distributed computing environments. In such environments, tasks are performed by remote processing devices linked via a communications network or other data transmission medium, and data and program code or modules may be located in both local and remote computer storage media including memory storage devices such as, but not limited to, hard drives, solid state drives (SSD), flash drives, USB drives, optical drives, and internet-based storage (e.g., "cloud" storage).

In one embodiment, a computer system comprises multiple client devices in communication with one or more server devices through or over a network, although in some cases no server device is used. In various embodiments, the network may comprise the Internet, an intranet, Wide Area Network (WAN), or Local Area Network (LAN). It should be noted that many of the methods of the present invention are operable within a single computing device.

A client device may be any type of processor-based platform that is connected to a network and that interacts with one or more application programs. The client devices each comprise a computer-readable medium in the form of volatile and/or nonvolatile memory such as read only memory (ROM) and random access memory (RAM) in communication with a processor. The processor executes computer-executable program instructions stored in memory. Examples of such processors include, but are not limited to, microprocessors, ASICs, and the like.

Client devices may further comprise computer-readable media in communication with the processor, said media storing program code, modules and instructions that, when executed by the processor, cause the processor to execute the program and perform the steps described herein. Computer readable media can be any available media that can be accessed by computer or computing device and includes both volatile and nonvolatile media, and removable and non-removable media. Computer-readable media may further comprise computer storage media and communication media. Computer storage media comprises media for storage of information, such as computer readable instructions, data, data structures, or program code or modules. Examples of computer-readable media include, but are not limited to, any electronic, optical, magnetic, or other storage or transmission device, a floppy disk, hard disk drive, CD-ROM, DVD, magnetic disk, memory chip, ROM, RAM, EEPROM, flash memory or other memory technology, an ASIC, a configured processor, CDROM, DVD or other optical disk storage, magnetic cassettes, magnetic tape, magnetic disk storage or other magnetic storage devices, or any other medium from which a computer processor can read instructions or that can store desired information. Communication media comprises media that may transmit or carry instructions to a computer, including, but not limited to, a router, private or public network, wired network, direct wired connection, wireless network, other wireless media (such as acoustic, RF, infrared, or the like), or other transmission device or channel. This may include computer readable instructions, data structures, program modules or other data in a modulated data signal such as a carrier wave or other transport mechanism. Said transmission may be wired, wireless, or both. Combinations of any of the above should also be included within the scope of computer readable media. The instructions may comprise code from any computer-programming language, including, for example, C, C++, C#, Visual Basic, Java, and the like.

Components of a general purpose client or computing device may further include a system bus that connects various system components, including the memory and processor. A system bus may be any of several types of bus structures, including, but not limited to, a memory bus or memory controller, a peripheral bus, and a local bus using any of a variety of bus architectures. Such architectures include, but are not limited to, Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing and client devices also may include a basic input/output system (BIOS), which contains the basic routines that help to transfer information between elements within a computer, such as during start-up. BIOS typically is stored in ROM. In contrast, RAM typically contains data or program code or modules that are accessible to or presently being operated on by processor, such as, but not limited to, the operating system, application program, and data.

Client devices also may comprise a variety of other internal or external components, such as a monitor or display, a keyboard, a mouse, a trackball, a pointing device, touch pad, microphone, joystick, satellite dish, scanner, a disk drive, a CD-ROM or DVD drive, or other input or output devices. These and other devices are typically connected to the processor through a user input interface coupled to the system bus, but may be connected by other interface and bus structures, such as a parallel port, serial port, game port or a universal serial bus (USB). A monitor or other type of display device is typically connected to the system bus via a video interface. In addition to the monitor, client devices may also include other peripheral output devices such as speakers and printer, which may be connected through an output peripheral interface.

Client devices may operate on any operating system capable of supporting an application of the type disclosed herein. Client devices also may support a browser or browser-enabled application. Examples of client devices include, but are not limited to, personal computers, laptop computers, personal digital assistants, computer notebooks, hand-held devices, cellular phones, mobile phones, smart phones, pagers, digital tablets, Internet appliances, and other processor-based devices. Users may communicate with each other, and with other systems, networks, and devices, over the network through the respective client devices.

As used herein, the singular forms "a," "an" and "the" include plural referents unless the context clearly dictates otherwise. Further, the terms "additional", "optional", "optionally", "may" and the like mean that the subsequently described operation, event or functionality mayor may not be required, and that the description includes instances where said operation, event or functionality occurs and instances where it does not. The word "comprise" and variations of that word, and the word "include" and variations of that word, mean "including but not limited to," and are not intended to exclude, for example, other components, steps, or operations. "For example" and "exemplary" mean "an example of" and are not intended to convey an ideal embodiment.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. The system, methods and apparatus of the present invention are not limited to specific components, network connections, or arrangements described and disclosed herein, as such may vary. It is also to be understood that the terminology used herein is for the purpose of describing particular embodiments only, and is not intended to be limiting. Even though specific embodiments of this invention have been described, they are not to be taken as exhaustive. There are several variations that will be apparent to those skilled in the art.

The following are sample representative claims, as might appear in a non-provisional application claiming benefit to the filing date of this provisional application. Since the present application is a provisional application, no claim is required. Thus, by presenting the following representative claims, the intention is that the representative claims shall be considered as a part of the disclosure of the invention only, and shall not be a limitation, with respect to the range of equivalents or scope, of any claims which might ultimately issue in any applications claiming priority to this provisional application. Sample representative claims are as follows:

What is claimed is:

1. A connected fleet management system, comprising:
a plurality of fleet vehicles, each vehicle comprising an electronic control unit for wirelessly transmitting vehicle data to a network; and
at least one fleet management system server with a microprocessor programmed to provide connected fleet management services, said fleet management services comprising managing and scheduling maintenance and repairs of fleet vehicles;
wherein said managing and scheduling maintenance and repairs comprise
(a) receiving a report of an actual or predicted problem from a self-reporting fleet vehicle; and
(b) reviewing likely failure modalities probability distribution for other fleet vehicles geographically adjacent to the self-reporting fleet vehicle.

2. The system of claim 1, wherein likely failure modalities probability distribution for other fleet vehicles include for both the actual or predicted problem that was self-reported, and other problems or failures.

3. The system of claim 1, wherein said managing and scheduling maintenance and repairs further comprise
(d) building one or more optimal maintenance manifestos across multiple fleet vehicles in a selected area.

4. The system of claim 3, wherein the one or more optimal maintenance manifestos solve for (i) the total cost of the maintenance manifesto across said multiple fleet vehicles in the selected area; (ii) total expected downtime across said multiple fleet vehicles in the selection area; and © minimization of any cancelled reservations or reservations to be cancelled.

5. The system of claim 4, wherein said managing and scheduling maintenance and repairs further comprise
(e) comparing the total cost of the maintenance manifesto with the cost of taking no action while keeping the self-reporting vehicle closed to reservations.

6. The system of claim 5, wherein if the total cost of the maintenance manifesto is less than the cost of taking no action while keeping the self-reporting vehicle closed to reservations, implementing the optimal maintenance manifesto.

7. The system of claim 5, wherein if the total cost of the maintenance manifesto is greater than the cost of taking no action while keeping the self-reporting vehicle closed to reservations, taking no action.

8. The system of claim 7, wherein if no action is taken, updating the probability distributions, building at least one new optimal maintenance manifesto, and re-evaluating the total cost of the at least one new optimal maintenance manifesto with the cost of taking no action while keeping the self-reporting vehicle closed to reservations.

9. The system of claim 1, wherein said managing and scheduling maintenance and repairs further comprise initiating a self-service ticket for the self-reporting fleet vehicle.

10. The system of claim 1, wherein said managing and scheduling maintenance and repairs further comprise locking the self-reporting fleet vehicle from further reservations.

11. The system of claim 1, wherein said managing and scheduling maintenance and repairs further comprise reviewing likely failure modalities probability distribution for other failures for the self-reporting fleet vehicle.

* * * * *